(12) United States Patent
Chiba et al.

(10) Patent No.: US 6,700,684 B1
(45) Date of Patent: Mar. 2, 2004

(54) IMAGE INPUTTING APPARATUS

(75) Inventors: Hirotaka Chiba, Kawasaki (JP);
Kenichiro Sakai, Kawasaki (JP);
Tsugio Noda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/237,234

(22) Filed: Jan. 26, 1999

(30) Foreign Application Priority Data

Jan. 28, 1998 (JP) .......................................... 10-015679
Jan. 30, 1998 (JP) .......................................... 10-020042
Jan. 30, 1998 (JP) .......................................... 10-020043

(51) Int. Cl.[7] .............................................. H04N 1/04
(52) U.S. Cl. ...................................... 358/474; 358/497
(58) Field of Search ............................... 358/474, 465, 358/466, 518, 497, 448, 522, 444, 473; 382/169, 162; 348/211, 219, 231

(56) References Cited

U.S. PATENT DOCUMENTS

| | | | | |
|---|---|---|---|---|
| 4,933,778 A | * | 6/1990 | Tufano | 358/488 |
| 5,075,787 A | * | 12/1991 | Shaughnessy | 358/452 |
| 5,138,479 A | * | 8/1992 | Ando | 359/216 |
| 5,920,342 A | * | 7/1999 | Umeda | 342/211 |
| 6,118,485 A | * | 9/2000 | Hinoue | 348/373 |
| 6,163,344 A | * | 12/2000 | Kawamura | 348/552 |
| 6,198,546 B1 | * | 3/2001 | Shimanaka | 358/473 |

FOREIGN PATENT DOCUMENTS

| | | |
|---|---|---|
| JP | 60-081976 | 5/1985 |
| JP | 60-124173 | 7/1985 |
| JP | 63-296557 | 12/1988 |
| JP | 64-005163 | 10/1989 |
| JP | 3-4665 | 1/1991 |
| JP | 4-44770 | 4/1992 |
| JP | 04-156063 | 5/1992 |
| JP | 4-196748 | 7/1992 |

(List continued on next page.)

OTHER PUBLICATIONS

JPO Office Action dated Jun. 25, 2002.
"Notice of Reason for Rejection" for Patent Application No. 10–020042 issued by Japanese Patent Office, mailed on Mar. 26, 2002 & its translation.

(List continued on next page.)

*Primary Examiner*—Kimberly A. Williams
*Assistant Examiner*—Negussie Worku
(74) *Attorney, Agent, or Firm*—Westerman, Hattori, Daniels & Adrian, LLP

(57) ABSTRACT

An image inputting apparatus includes an example to be in combination with an information processing system, which generally comprises an image reading unit and a PC card unit operatively connected to the image reading unit and the information processing system. The image reading unit comprises an image reading section for optically reading out an image on a medium to be read and converting a read-out image into an electric signal and a movement measuring section for measuring a moving amount of the image reading section moving on the medium, and the PC card unit comprises an image signal processing section for processing the analog image signal from the image reading section, a read-out control section for performing a driving control of the image reading section in accordance with the moving amount from the movement measuring section and a PC card interface (I/F) section operatively connected to the read-out control section and the external information processing system so as to perform interruption and access to the information processing system. The PC card unit has a structure in shape of card capable of being inserted into a predetermined portion of the information processing system in a manner such that, when the PC card unit is inserted thereinto, the image reading unit is positioned outside the information processing system.

24 Claims, 31 Drawing Sheets

FOREIGN PATENT DOCUMENTS

| | | |
|---|---|---|
| JP | 4-128468 | 11/1992 |
| JP | 5-18167 | 3/1993 |
| JP | 5-130320 | 5/1993 |
| JP | 7-154543 | 6/1995 |
| JP | 07-282179 | 10/1995 |
| JP | 7-283910 | 10/1995 |
| JP | 09-214693 | 8/1997 |

OTHER PUBLICATIONS

Japanese Office Action w/Translation dated Feb. 12, 2003.

"Notice of Reason for Rejection" for Patent Application No. 10–020042 issued by Japanese Patent Office, mailed on Mar. 26, 2002 & its translation.

* cited by examiner

THRESHOLD VALUE = $a$ × WHITE BOTTOM VALUE   ($0 < a < 1$)

$$\text{THRESHOLD VALUE} = \alpha \, (\text{WHITE BOTTOM VALUE} - \text{BLACK PEAK VALUE}) + \text{BALCK PEAK VALUE} \quad (0 < \alpha < 1)$$

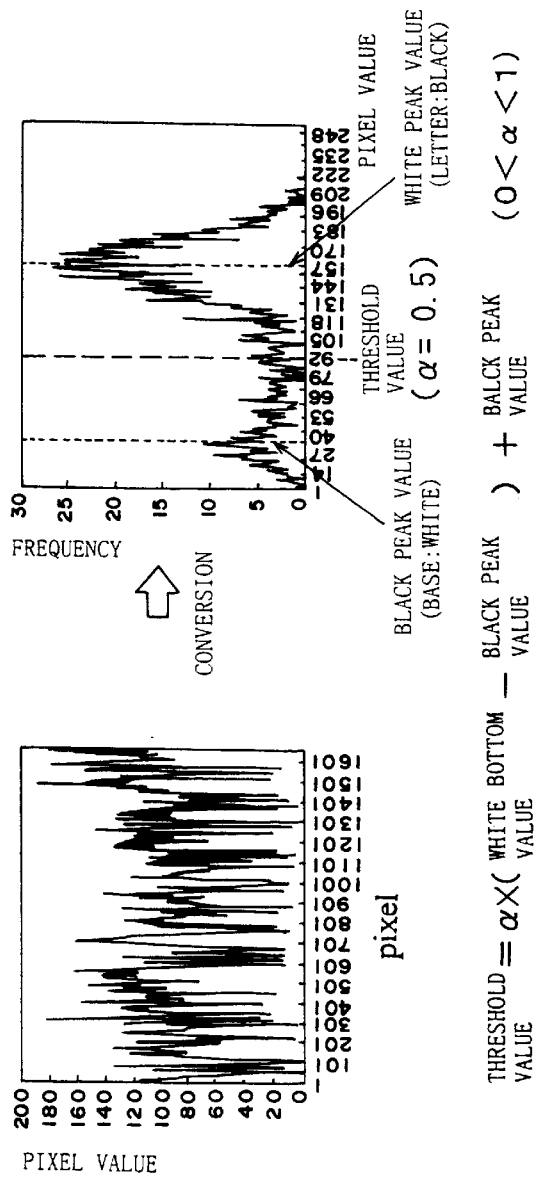
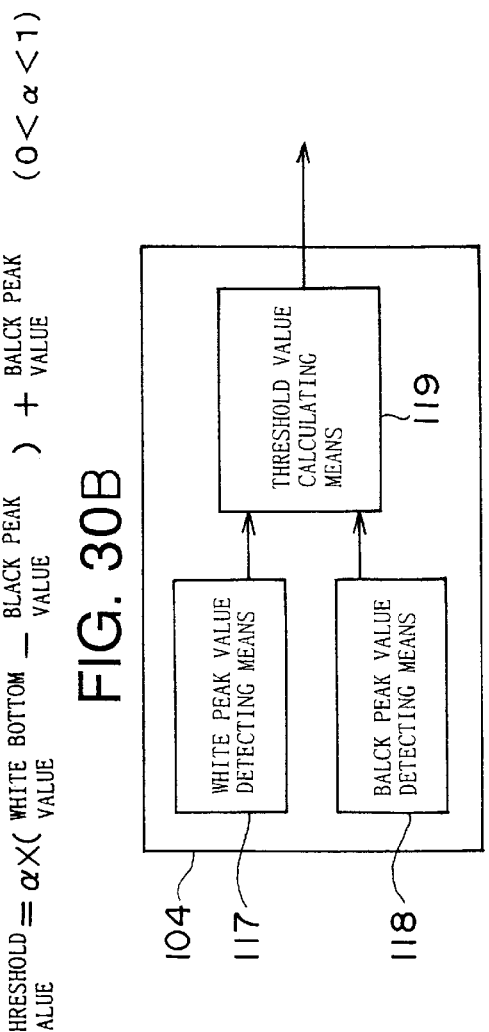
FIG. 30A
FIG. 30B

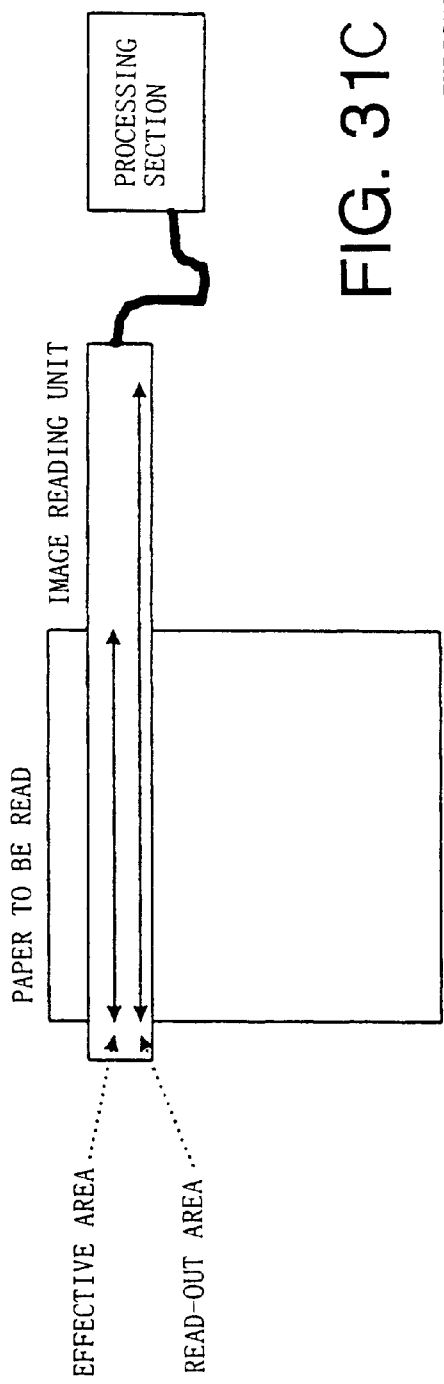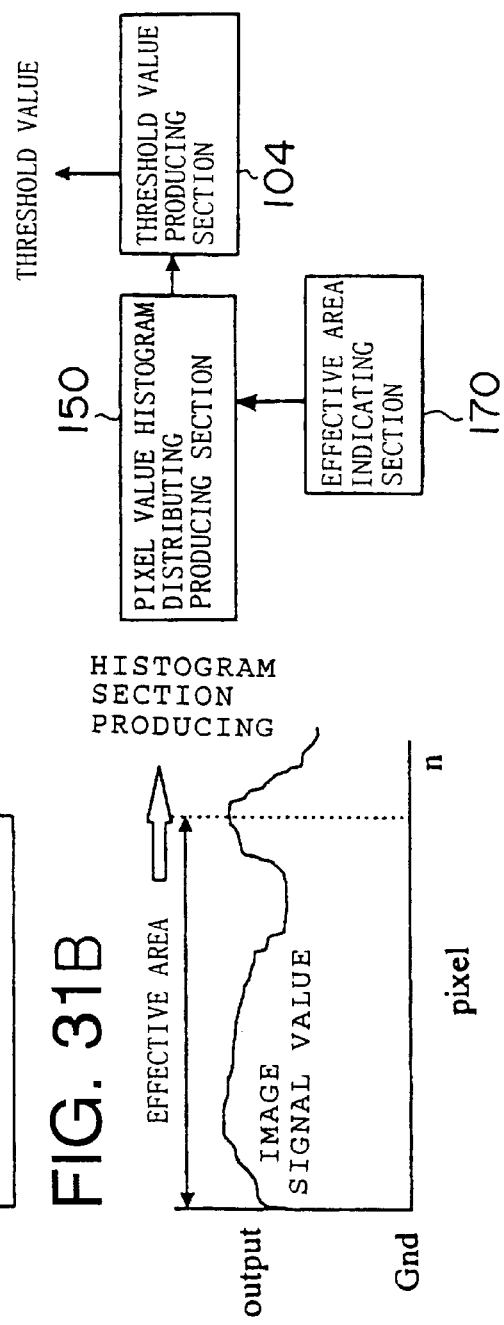

IMAGE INPUTTING APPARATUS

BACKGROUND OF THE INVENTION

The present invention relates to an image inputting apparatus such as scanner, facsimile and the like usable for an apparatus optically reading out letters or images described on medium such as paper.

The image inputting apparatus of the type mentioned above includes various types of scanner such as a card-type scanner which is usable in operative connection with an information processing unit such as portable information device such as electronic note, personal computer, personal word processor or the like and also includes an image reader generally comprising an image reading unit and an image processing unit.

For example, there is known a card-type scanner as a card-type image read-out memory device as disclosed in the Japanese Patent Laid-open (KOKAI) Publication No. SHO 64-5163. This card-type scanner is provided with a read-out section at a card central portion and the read-out operation is performed by slidingly scanning the card. Image data read out, through the scanning, is inputted into a memory section inside the card and is then outputted (displayed) to a dedicated output device through a card I/F, which is a dedicated device provided with a card throttle through which the card-type scanner can be inserted.

In recent days, an information processing unit provided with a card I/F has been developed by making compact a portable information device such as electronic note, personal computer, personal word processor or the like, whereby it becomes possible to directly display images read out by the scanner on a screen of the information processing unit.

In such conventional structure mentioned above, however, when performing the scanning operation while connecting the card-type scanner to the information processing unit and confirming the image data inputted by the card-type scanner, there is provided a problem that the whole body, except a connector, projects from a display device and also provided a difficulty for closely contacting a read-out surface of the scanner to a medium to be read out, further leading to a problem that a read-out operation while confirming the inputted image data cannot be precisely performed.

In view of the above problems, Japanese Patent Laid-open (KOKAI) Publication No. HEI 7-283910 provides an image reading device, which is composed of an image read-out module and a portable information equipment body, the image read-out module being integrally constructed of a sensor unit including an image sensor and a copy (medium) lightening means and a PC card interface unit, and the portable information equipment body being provided with an image display means and a PC card insertion unit. This image reading device is further provided with a fixing means for fixing the image read-out module to the portable information equipment body at a time when the image read-out module is inserted into the PC card insertion unit of the portable information equipment body to thereby read out (input) the image. In the image reading device of Japanese Patent Laid-open (KOKAI) Publication No. HEI 7-283910, however, since the image read-out module is merely fixed to the portable information equipment body, it is necessary to move the image read-out module and the portable information equipment body together with respect to the image read-out surface when the image is read out, thus being inconvenient in use.

Furthermore, in the conventional scanner of the type mentioned above, since an image reading direction can be freely selected, there is a case that an image may be reversed according to the image reading direction, thus also being inconvenient.

In another aspect, the image inputting apparatus is applied for an apparatus optically reading out letters or images described on a medium such as paper, converting the read-out images into electric signals which are then digitalized, and displaying and/or transferring the same.

Japanese Patent laid-open (KOKAI) Publication No.SHO 63-296557 discloses a conventionally known image read-out circuit means, which has a structure represented by a block diagram shown in FIG. 36, which comprises an image read-out unit 301, an A/D conversion unit 302 for converting analog signals of letters or images read out by the image read-out unit 301 into digital signals, a peak value storing unit 303 for detecting and storing a peak value (analog signal) of read-out values based on one line read-out of a copy to be read (inputted) and giving the peak value to the A/D conversion unit and an image processing unit 304 for binarizing (binary coding) the digital data from the A/D conversion unit 302 into whited ata and black data.

In this known image read-out circuit means, the peak value of the input data stored in the peak value storing unit is used for determining a dynamic range at the time of the A/D conversion in the A/D converter. Further, in the image processing unit, a reference value for the binary coding (binarization) is required. In this known circuit means, with reference to the peak value stored in the peak value storing unit, a threshold value as a reference for the binary coding judgement is determined.

According to the known circuit means mentioneda bove, since the threshold value is determined with reference to the peak value of the read-out values based on the one line read-out of the copy, in a case where large variation of the white data of the copy is caused by irregularity of the sensitivity of the sensor or lightening means, there may cause a case where the actual input white data becomes lower than the threshold value and, hence, is erroneously discriminated as black data and the threshold value cannot be stably produced. Thus, the binary coding or binarization processing of the image has not been accurately performed, providing a problem.

SUMMARY OF THE INVENTION

A primary object of the present invention is to substantially eliminate defects or drawbacks encountered in the prior art described above and to provide an image inputting apparatus which is capable of performing an easy and accurate image inputting operation and providing an improved structure therefor.

Another object of the present invention is to provide, in one aspect, an image inputting apparatus of a card-type scanner structure capable of easily reading images on a medium to be read and preventing the image from being reversely displayed due to a reading direction.

A further object of the present invention is to provide, in another aspect, an image inputting apparatus capable of accurately performing binarization (binary coding) even in a case of reading out a base portion (white portion) of the medium (copy) due to irregularity of sensor sensitivity or lightening condition in addition to easy maneuvability of an operator.

These and other objects can be achieved according to the present invention by providing, in one aspect, there is provided an image inputting apparatus to be used in combination with an information processing system, comprising an image reading unit and a PC card unit operatively connected to the image reading unit and the information processing system, the image reading unit comprising an image reading section for optically reading out an image on a medium to be read and converting a read-out image into an analog electric signal and a movement measuring section for measuring a moving amount of the image reading section moving on the medium, and the PC card unit comprising an image signal processing section for processing the analog image signal from the image reading section, a read-out control section for performing a driving control of the image reading section in accordance with the moving amount from the movement measuring section and a PC card interface (I/F) section operatively connected to the read-out control section and the external information processing system so as to perform interruption and access to the information processing system, and the PC card unit having a structure in shape of card capable of being inserted into a pre-determined portion of the information processing system in a manner such that, when the PC card unit is inserted into the information processing system, the image reading unit is positioned outside the information processing system.

In preferred embodiments of this aspect, the PC card unit and the image reading unit are integrated together so that the image reading unit project outward the information processing system so as to be rotatable about an axis extending at least one of an extending direction of the PC card unit and a direction perpendicular to the extending direction.

The PC card unit and the image reading unit are composed of independent structures from each other, which are operatively connected through a connection means. The connection means comprises a flexible cable and a connector.

The image reading unit has a box-shaped structure and the connection means is accommodated in the box-shaped image reading unit.

The image reading unit further comprises an image signal amplifying section operatively connected to the image reading section for amplifying an analog image signal therefrom. The PC card unit further comprises a driving condition setting section operatively connected to the read-out control section for setting driving conditions for the image reading section.

The image reading unit is further provided with means for giving image read-out start/finish instruction to the read-out control section of the PC card unit. The box-shaped image reading unit is further provided detachably with a reading assisting means at a surface portion thereof to read out an image on the medium by moving the medium in front of the surface of the image reading unit on which the reading assisting means is mounted. The reading assisting means is composed of a pair of rollers disposed with a gap, which are rolled by passing the medium through the gap therebetween with substantially no load.

The PC card unit further comprises means for changing an order to image data to be read out in accordance with an image reading direction preliminarily set to the read-out control section.

The read-out control section performs image read-out control in accordance with an image read-out start/finish instruction from the information processing system.

According to this aspect of the present invention, when the image inputting apparatus of the card-type scanner structure is inserted into the information processing system, since the image reading unit including the image reading section and the movement (moving amount or distance) measuring section projects over the information processing system, the reading (inputting) process can be done while confirming the image on the display means of the information processing system with the card-type scanner being integrated with the information processing system, thus being convenient.

Since the projected image reading unit is constructed to be rotatable with respect to the PC card unit inserted into the information processing system, the display means can be directed to an operator regardless of the image scanning direction, and accordingly, the inputting operation can be done while confirming the reading image.

In the arrangement in which the PC card unit is independently formed from the image reading unit, which are operatively connected by the connection means, the image on the medium to be read can be read out at a portion remote from the information processing system by freely selecting the reading (scanning) direction.

In the arrangement provided with the analog signal amplifying section, fine or weak read-out image signal can be amplified, and hence, the image on the medium remotely positioned can be freely read out with a proper magnitude.

In the arrangement provided with the driving condition setting section, the read-out can be done even if the sensor disposed in the separate unit is changed freely in size.

In an arrangement in which the sensor of the image reading unit is a single dimensional line sensor, in the case where the reading direction of the sensor does not accord with the scanning direction of the card-type scanner, the read-out data has mirror image relationship and it is therefore necessary to change the data after the reading (inputting) process. According to the present invention, in such case, the read-out data order can be reversed by preliminarily inputting the reading direction of the card-type scanner to the control means to thereby always read out the correctly directed image data.

In the arrangement in which the read-out control is performed by the read-out start/finish instruction from the information processing system, the read-out processing can be done by the start/finish instruction from the information processing system while confirming the reading image displayed on the display means of the information processing system, thus realizing an improved maneuvability of an operator.

The start/finish instruction may be executed by the start/finish indicating section provided in the image reading unit, in such arrangement, when the PC card unit is independently disposed from the image reading unit, the improved maneuvability can be done with high accuracy even in the arrangement of the information processing system remote from the image reading unit.

In the arrangement of the read-out assisting means on the front portion of the box-shaped image reading unit, the reading (inputting) process can be done even if the medium to be read has a small size.

Many other advantageous effects and functions may be achieved by organic combination or modification of the above various embodiments in this aspect of the present invention.

In another aspect of the present invention, there is provided an image inputting apparatus comprising an image reading unit and an image processing unit operatively connected to the image reading unit, the image reading unit comprising a sensor means for optically reading out an image on a medium to be read and an A/D conversion means for converting a read-out image into a digital electric signal, and the image processing unit comprising an image processing section operatively connected with the image reading unit for performing a binarization processing of the image signal, a data storing section for storing input-data representing white and black portions of a medium to be read, and a threshold value producing section for producing a threshold value in accordance with data from the data storing section and transferring the threshold value to the image processing section, the threshold value producing section including a white bottom value detecting means for detecting a white bottom value as a minimum data in the input data of the white portion as a read-out reference and a threshold value calculating means for calculating the threshold value (S) by using the white bottom value (WB) detected by the white bottom value detecting means in accordance with the following equation:

$$S=\alpha \times WB(0<\alpha<1) \quad (1)$$

($\alpha$: coefficient for determining a threshold value).

In preferred embodiments of this aspect, the threshold value producing means further includes a black peak value detecting means for detecting a black peak value as a maximum value in the input data of the black portion as a read-out reference and the threshold value calculating means calculates the threshold value (S) by using the white bottom value (WB) detected by the white bottom value detecting means and the black peak value (BP) detected by the black peak value detecting means in accordance with the following equation:

$$S=\alpha \times (WB-BP)+BP(0<\alpha<1) \quad (2)$$

($\alpha$: coefficient for determining a threshold value).

The threshold value producing means may further include a black peak value storing means for storing data preliminarily set with a black peak value being a read-out reference and the threshold value calculating means calculates the threshold value (S) by using the white bottom value (WB) detected by the white bottom value detecting means and the black peak value (BP) stored in the black peak value storing means in accordance with the following equation:

$$S=\alpha \times (WB-BP)+BP(0<\alpha<1) \quad (3)$$

($\alpha$: coefficient for determining a threshold value).

The image processing unit further includes a level correction means for correcting a level of the input data from the image reading unit before transferring the data to the image processing section. The level correction means is composed of a shading compensation section.

The image inputting apparatus further comprises an area indication means for defining a usable area of the input data and transferring only data on a preliminarily designated area of the medium to be read as an input data to the threshold value producing section.

According to this aspect of the present invention, for example, in the embodiment represented by the equation (1), in a case where $\alpha$ is ½ (smaller than 1), for example, the threshold value obtained by this equation (1) is always less than the white bottom value, and accordingly, if the read-out value varies, the read-out image signal of the white portion is not lower than the threshold value and, hence, is hardly discriminated as black portion, which may be caused in the conventional technology.

Furthermore, in the embodiments represented by the equation (2) or (3), in a case where $\alpha$ is ½ (smaller than 1), for example, the threshold value obtained by this equation (2) is always less than the white bottom value and more than the black peak value, and accordingly, if the read-out value varies, the read-out image signal of the white portion is not lower than the threshold value and, hence, is hardly discriminated as black portion, and the black portion is never erroneously discriminated as white portion, which may be caused in the conventional technology.

Furthermore, the black peak value is preliminarily set as experimental value without inputting the black portion as reference value, and in such case, substantially the same functions and effects as those mentioned above can be attained through the equation (3).

In the arrangement provided with the shading compensation section, the dynamic range of the input data can be widened in the entire area of the sensor, thus being advantageous.

In the arrangement provided with the effective area indication section, noises or the like other than designated area can be eliminated.

Many other advantageous effects and functions may be achieved by organic combination or modification of the above various embodiments in this aspect of the present invention.

In a further aspect of the present invention, there is provided an image inputting apparatus comprising an image reading unit and an image processing unit operatively connected to the image reading unit, the image reading unit comprising a sensor means for optically reading out an image on a medium to be read and an A/D conversion means for converting a read-out image into a digital electric signal, and the image processing unit comprising an image processing section for performing a binarization processing of the image signal, a data storing section for storing input data from the image reading unit, a pixel value histogram distribution producing section for producing a pixel value histogram distribution in accordance with the input data, and a threshold value producing section for producing a threshold value in accordance with data from said pixel value histogram distribution producing section and transferring the threshold value to the image processing section for the binarization processing therein.

In preferred embodiments of this aspect, the image processing unit may further comprise a shading compensation section for performing a shading compensation to the input data from the image reading unit and said data storing section stores the thus compensated input data.

The threshold value producing section includes a white peak value detecting means for detecting a white peak value in the input data of the white portion of the medium to be read, a black peak value detecting means for detecting a black peak value in the input data of the black portion of the medium and a threshold value calculating means for calculating the threshold value (S) by using the white peak value (WP) detected by the white peak value detecting means and the black peak value (BP) detected by the black peak value detecting means in accordance with the following equation:

$$S=\alpha \times (WP-BP)+BP(0<\alpha<1)$$

($\alpha$: coefficient for determining a threshold value).

The pixel value histogram distribution producing section produces the pixel value histogram distribution only on the basis of the input data with a defined range on a preliminarily designated one line.

The input data storing section stores a specified one line data of the medium to be read and the threshold value producing section produces a threshold value in accordance with the thus stored one line data. The input data storing section stores one line data per N lines (N:integer not less than 1) of the input data of the medium to be read and the threshold value producing section produces a threshold value in accordance with the thus stored line data.

According to this aspect of the present invention, the white (base) portion and the black (letter or image) portion can be correctly detected by providing the pixel value histogram distribution section.

That is, the pixel values (gray level) of the inputted data are distributed between the white (base) and black (letter) portion of the medium to be read. In general, the letter portion includes white portions between letters, and accordingly, the white pixel value is distributed in a certain ratio. Further, in the case of high optical resolution, the letter portion distribution also includes ink level of the letters in a certain ratio. Accordingly, the white (base) portion and the black (letter) portion can be correctly detected by providing the pixel value histogram distribution section.

Even in the case of the input data under the presence of the irregularity of the sensor sensitivity or lightening means, the white peak value and the black peak value of the input level of the medium to be read can be stored as reference values by way of the pixel value histogram distribution of the input data, and the threshold value can be produced by using such reference values, so that the obtained threshold values never exceed the white and black levels, thus always correctly performing the binarization (binary coding).

In this aspect, the shading compensation means may be also utilized as in the former aspect, and accordingly, the dynamic range of the input data can be widened in the entire area of the sensor, and in a case of a pseudo intermediate tone input level, correct processing can be always performed by the thus obtained threshold values.

In the arrangement of the effective area indication means, a medium to be read having a length shorter than the effective length of the image reading unit can be correctly read out and inputted and the threshold value can be calculated by using the white and black peak values obtained by the pixel value histogram distribution and the input data of a defined portion of a preliminarily designated one line. Accordingly, even in the case where portions (background) other than the pixel value range of the medium to be read are simultaneously inputted, the binarized (binary coded) threshold value can be produced.

In a case where the processing for producing the pixel value histogram distribution from the input data and obtaining the white and black peak values by way of software, much time and many processes are required. Then, such processing is separately performed from an actual read-out processing. One line reading of the medium is once performed separately from the required reading process and the most optimum single coded threshold value is determined. Thereafter, with the same kind of medium, the same binary coded threshold value is used to thereby prevent the delay of the reading processing from causing, thus performing the accurate binarization processing.

Furthermore, in a usual reading process, same kind of mediums are continuously read out, and particularly, in a case where a read out area is smaller than the medium size, the last stage of the medium reading process will includes the base portion and letter portion. Then, the input data is read out at the finish time of the reading, and in the next reading process, the pixel value histogram is proposed by the stored input data thus obtained and the white and black peak values can be hence obtained. According to such processes, the most optimum binarization can be performed.

Many other advantageous effects and functions may be achieved by organic combination or modification of the above various embodiments in this aspect of the present invention.

The nature and further characteristic features of the present invention will be made more clear from the following descriptions by way of the preferred embodiment with reference to the accompanying drawings.

BRIEF DESCRIPTION OF THE DRAWINGS

In the accompanying drawings:

FIG. 30A shows a graph representing a relationship between the read-out image signals and the pixel value histogram distribution according to a third embodiment of the third aspect of the present invention and FIG. 30B is a block diagram showing a detail of the threshold value producing section of this embodiment of the present invention;

FIGS. 31A to 31C are views explaining a case wherein an effective area has a length shorter than a readable length of the image reading unit according to the third aspect of the present invention, which are similar to FIGS. 22 to 24, respectively, according to a fourth embodiment of the third aspect of the present invention;

DESCRIPTION OF THE PREFERRED EMBODIMENTS

Preferred embodiments of the present invention will be described hereunder with reference to the accompanying drawings.

FIGS. 1 to 14 represent a first aspect of the present invention including several preferred embodiments, and the image inputting apparatus of this aspect arerepresented by a card-type scanner having the following general structure or arrangement.

Basic Structure

Figure 1:
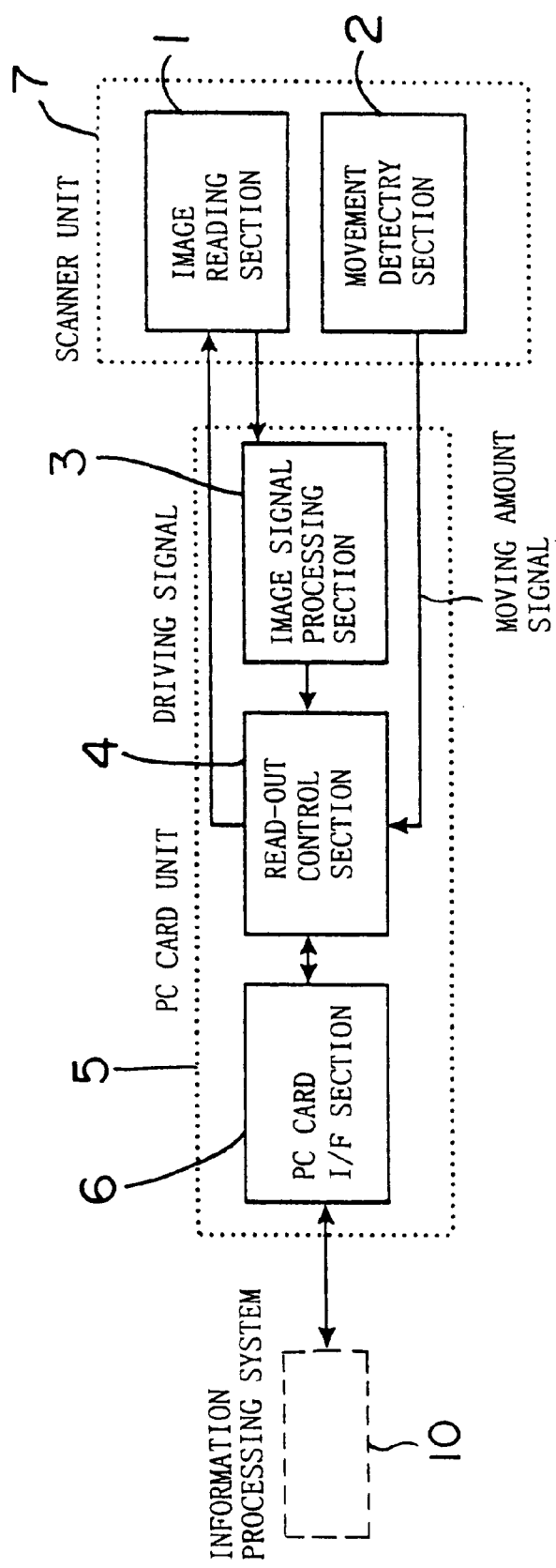
FIG. 1 is a schematic diagram showing a basic arrangement of an image inputting apparatus having card-type scanner structure according to a first aspect of the present invention.

FIG. 1 is a block diagram showing one example of a card-type scanner as an image inputting apparatus of the present invention. The card-type scanner comprises an image reading section 1 adapted to optically read out images on a medium such as paper and convert the read-out image into an analog signal, a movement (moving amount or distance) measuring section 2 adapted to measure a moving amount on the medium of the image reading section 1, an image signal processing section 3 adapted to process the analog signal generated from the image reading section 1, a read-out control section 4 adapted to control the image reading section 1 in accordance with the moving amount measured by the movement measuring section 2, and a PC card interface (I/F) section 6 outputting read-out data to an external information processing system, mentioned hereinlater. The image reading section 1 and the movement measuring section 2 may be accommodated in a box-type casing as an image reading unit or scanning unit 7. The image signal processing section 3, the read-out control section 4 and the PC card I/F section 6 are accommodated in a PC card unit 5.

Figure 2:
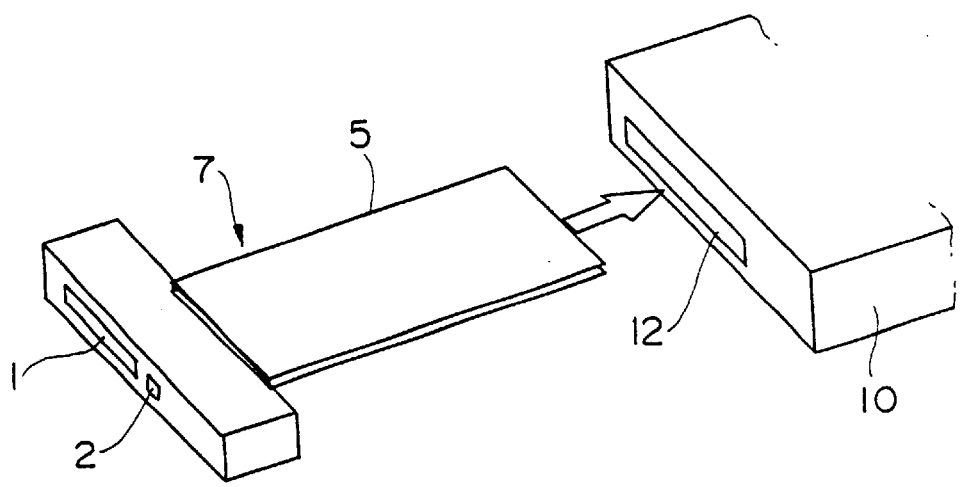
FIG. 2 is a perspective view of the image inputting apparatus (card-type scanner) of FIG. 1.
Figure 3:
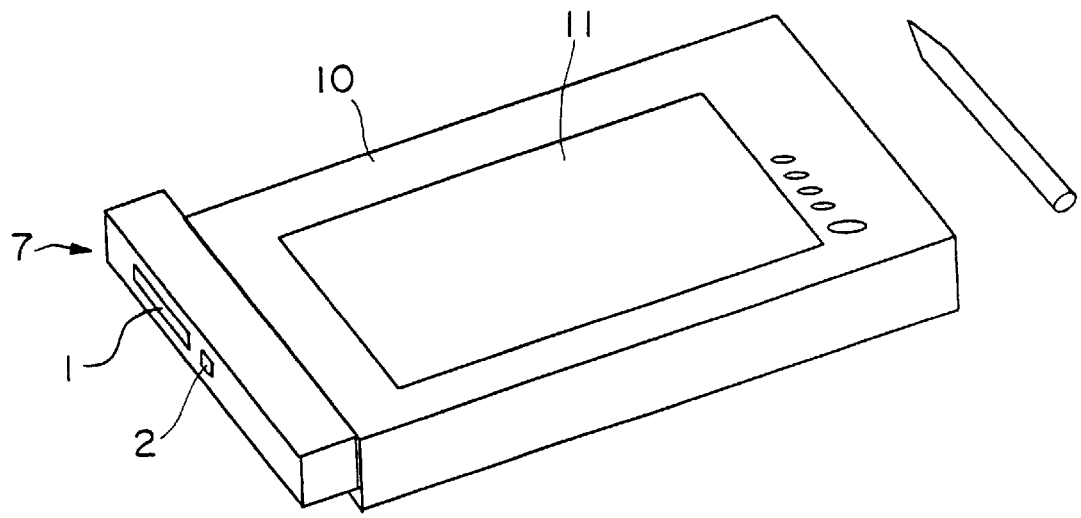
FIG. 3 is a perspective view of the image inputting apparatus assembled with an information processing system.

FIG. 2 is a perspective view of the card-type scanner according to the present invention and FIG. 3 is also a perspective view showing the connection of the card-type scanner to an associated information processing system 10. The PC card unit 5 has a structure capable of being inserted into a PC card slot 12 formed inside the information processing system 10.

The box-shaped scanning unit 7, in which the image reading section 1 and the movement measuring section 2 are accommodated, is disposed on one end side of the PC card unit 5 opposite to the other end side thereof to be inserted into the information processing system 10 so as to project outward from the information processing system 10 when the PC card unit 5 is inserted thereinto.

Figure 4:
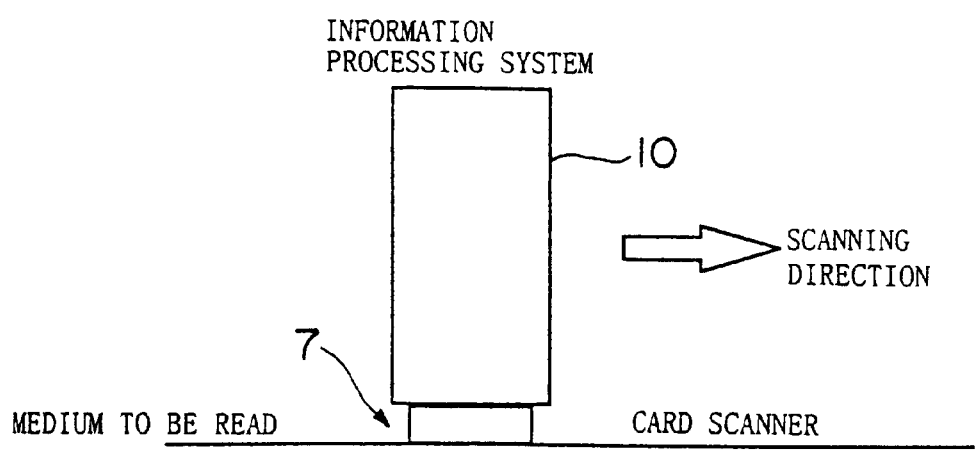
FIG. 4 is a view explaining a scanning operation of the first aspect of the image inputting apparatus of FIG. 1.

FIG. 4 is a view showing a state of reading i.e.scanning, a copy to be read as a read-out medium by the card-type scanner integrated with the information processing system 10. The information processing system 10 has a portable size and provided at its one surface side with a liquid crystal display as a display section 11. The information processing system 10, in a state integrated with the card-type scanner, is closely contacted to the medium to be read, the integrated system is manually moved so as to perform scanning operation on the read-out medium. Images read out through the scanning are displayed in the read-out order on the display section 11 and the image data can be hence read out while confirming the images on the display section 11.

Figure 5:
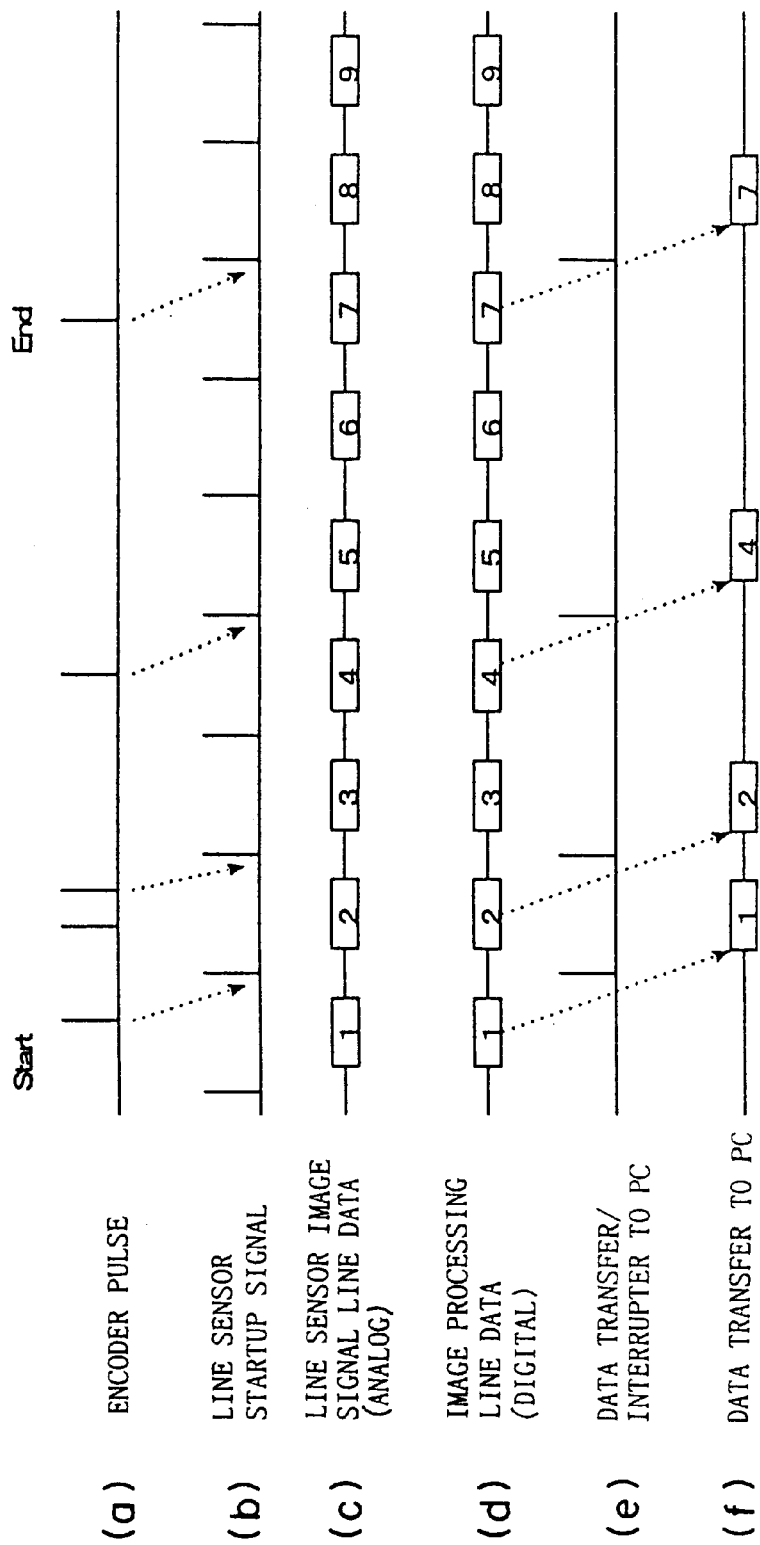
FIG. 5 shows a time chart representing image reading sequence according to the first aspect of the present invention.

FIG. 5 is a time chart showing the flow of control and data at the read-out time by the card-type scanner of the present invention of the structure mentioned above. The time chart shows a read-out example of 4-line data, which will be described in detail hereunder with reference to the block diagram of FIG. 1.

The image reading section 1 reads the images, in close contact to the medium, by a line sensor, a lightening means (light emitting diode (LED) or cold cathode tube) and a lens. The lightening means is lightened during the reading operation and the line sensor is driven to start the reading (inputting) by means of startup signal to thereby convert a reflected light amount on respective points on the sensor into electric signals and then transmit them as analog signals.

The movement measuring section 2 serves to convert the moving amount of the reading section 1 on the read-out medium by means of encoder into pulse signals, which are then transmitted therefrom. The image processing section 3 serves to digitalize the image signals from the image reading section 1 by means of A/D converter circuit and, as occasion demands, further serves to perform the image processing such as binary coding.

The read-out control section 4 serves to control an entire read-out operation and transfer the data to the information processing system 10. These operations are always performed during the read-out of a startup signal to the line sensor and the line data of the processed images is stored in a buffer means disposed in the control section 4. When the pulse regarding the moving amount or distance of the image reading section from the movement measuring section 2 is detected, the line data of the processed image stored in the buffer of an object line is interrupted into the information processing system 10 to thereby perform the transfer of the data. In a case where the movement pulse is detected more than two times in one driving cycle of the line sensor, only the data of one detection is transferred because the scanner is moved in frequency more than the read-out performance of the scanner. In a case where the movement pulse is not detected in one driving cycle of the line sensor, the scanner is not moved and, accordingly, the line data of the processed image stored in the buffer is disposed and the storing of the next data is performed.

The PC card I/F 6 performs an electrical interface to the information processing system 10 so as to carry out the interruption and data access. The data transferred to the information processing system 10 is displayed on the display section 11 of the information processing system 10 and the image data now being read out can be confirmed.

Although, in the example represented by the time chart of FIG. 5, the data is transferred per every one line to the information processing system 10, a plurality of line data can be gathered and transferred thereto by making large the capacity of the buffer in the read-out control section 4.

The card-type scanner as the image inputting apparatus of the first aspect of the present invention mentioned above includes the following embodiments.

First Embodiment

Figure 6A:
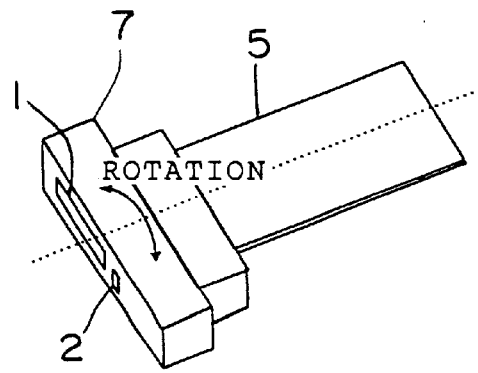
FIGS. 6A to 6C are views showing basic operation of a first embodiment of the first aspect of the present invention.
Figure 6B:
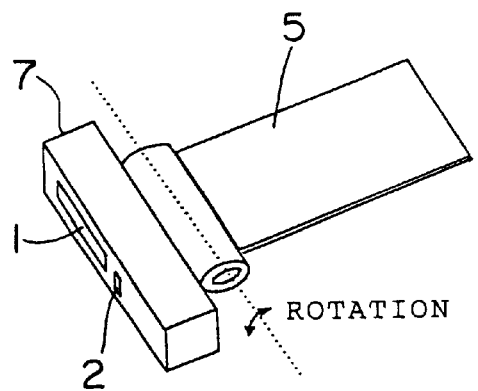
Figure 6C:
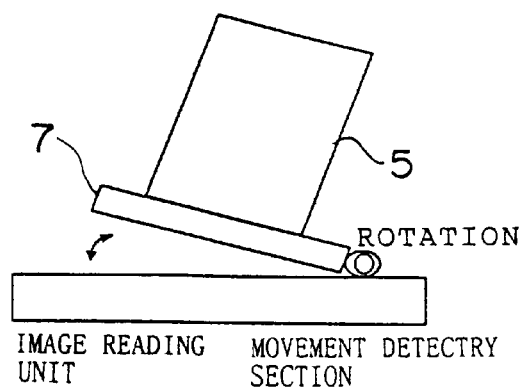

Three examples having the basic structure mentioned above will be described hereunder with reference to FIGS. 6A, 6B and 6C, in which the image reading section 1 and the movement measuring section 2 both projecting from the information processing system 10 are made to be rotatable together with respect to the PC card unit 5. In the example of FIG. 6A, the central axis for rotation is directed towards an extension of the PC card unit 5, in the example of FIG. 6B, the central axis for rotation is directed towards a direction perpendicular to the extension of the PC card unit 5, and in this example, a rotating mechanism constituting the rotation axis is interposed between the end portion of the PC card unit 5 and the image reading section 1, and in the example of FIG. 6C, the central axis for rotation is directed to the same direction as that in the example of FIG. 6B, but the central axis in the PC card unit extension and the rotation central axis has a twisted positional relationship, that is, a rotating mechanism is arranged to the end portion in the longitudinal direction of the image reading section 1.

According to the structures of the examples mentioned above, the display section 11 of the information processing system 10 can be always directed to a user regardless of the scanning direction and the input images at the read-out time can be easily confirmed by the user.

Second Embodiment

Figures 7A, 7B, 7C:
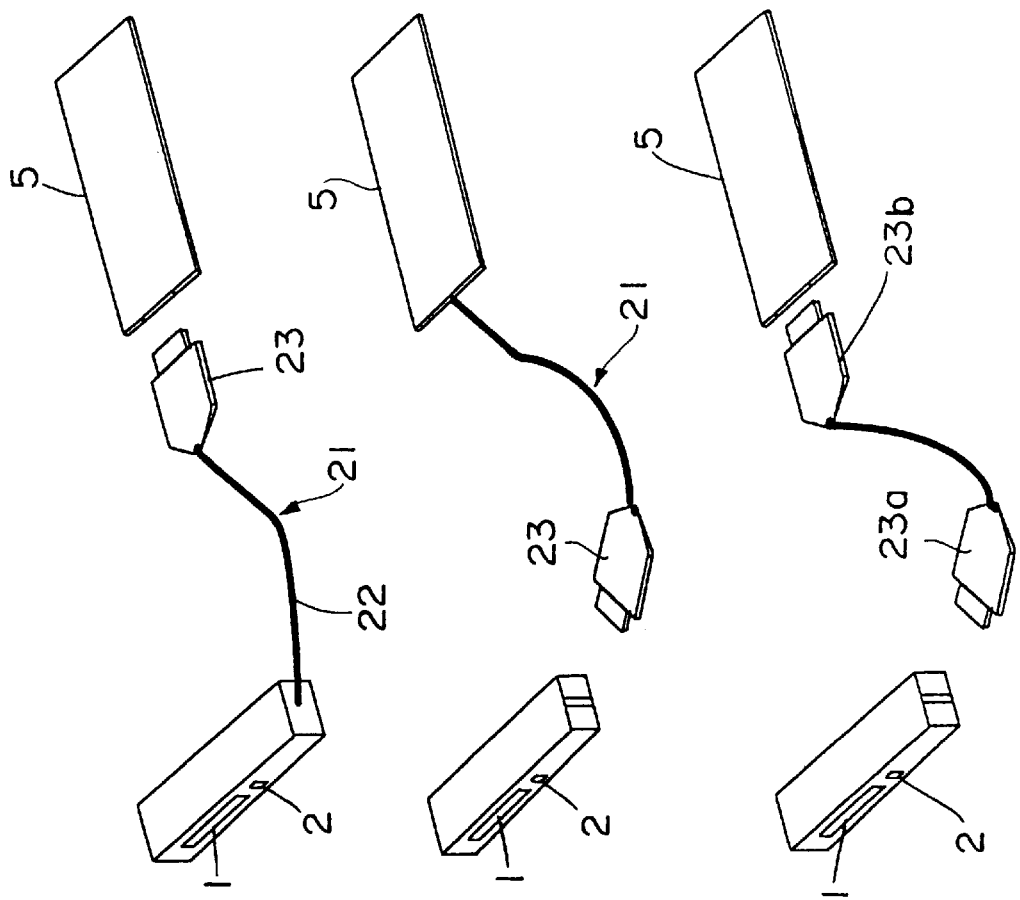
FIGS. 7A to 7C are views showing basic operation of a second embodiment of the first aspect of the present invention.

The second embodiment of this aspect of the present invention will be descried hereunder with reference to FIGS. 7A, 7B and 7C, in which the PC card unit 5 and the image reading unit (scanning unit 7), including the image reading section 1 and the movement measuring section 2, which project over the information processing system 10, are composed independently, which are connected through a connection means 21.

The connection means 21 is composed of a flexible cable 22 and a connector 23. In the example of FIG. 7A, the cable 22 is directly connected to the image reading section 1 and connected to the PC card unit 5 through the connector 23, in the example of FIG. 7B, the cable 22 is directly connected to the PC card unit 5 and connected to the image reading section 1 through the connector 23, and in the example of FIG. 7C, the cable 22 is connected to the image reading section 1 through a first connector 23a and connected to the PC card unit 5 through a second connector 23b.

According to these examples, since the scanning unit 7 and the PC card unit 5 are connected through the connecting means 21 such as cable 22, there is no limit in the scanning direction at a portion remote from the apparatus. Moreover, the scanning unit 7 having box-shaped structure can be preserved separately from the PC card unit 5 at the time of not using the apparatus, having an advantageous merit for maintenance. Further, a cable-less connection may be adopted by using a wireless transferring means or light transferring means, not shown, as the connecting means 21.

Third Embodiment

Figure 8:
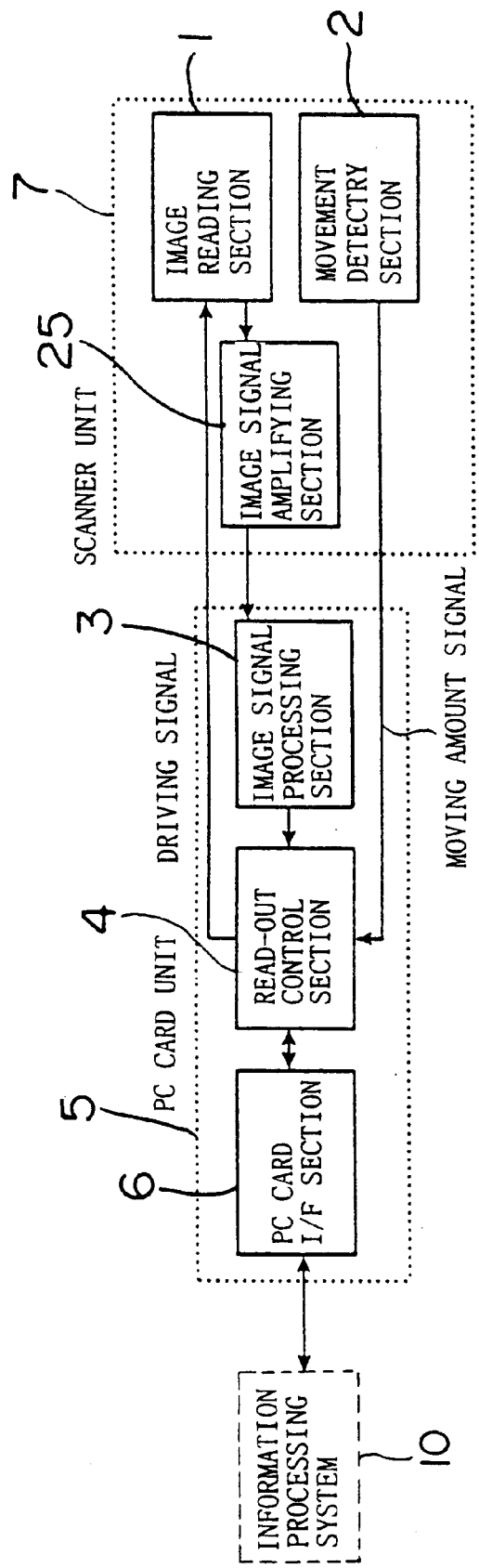
FIG. 8 is a block diagram showing a third embodiment of the first aspect of the present invention.
Figure 9:
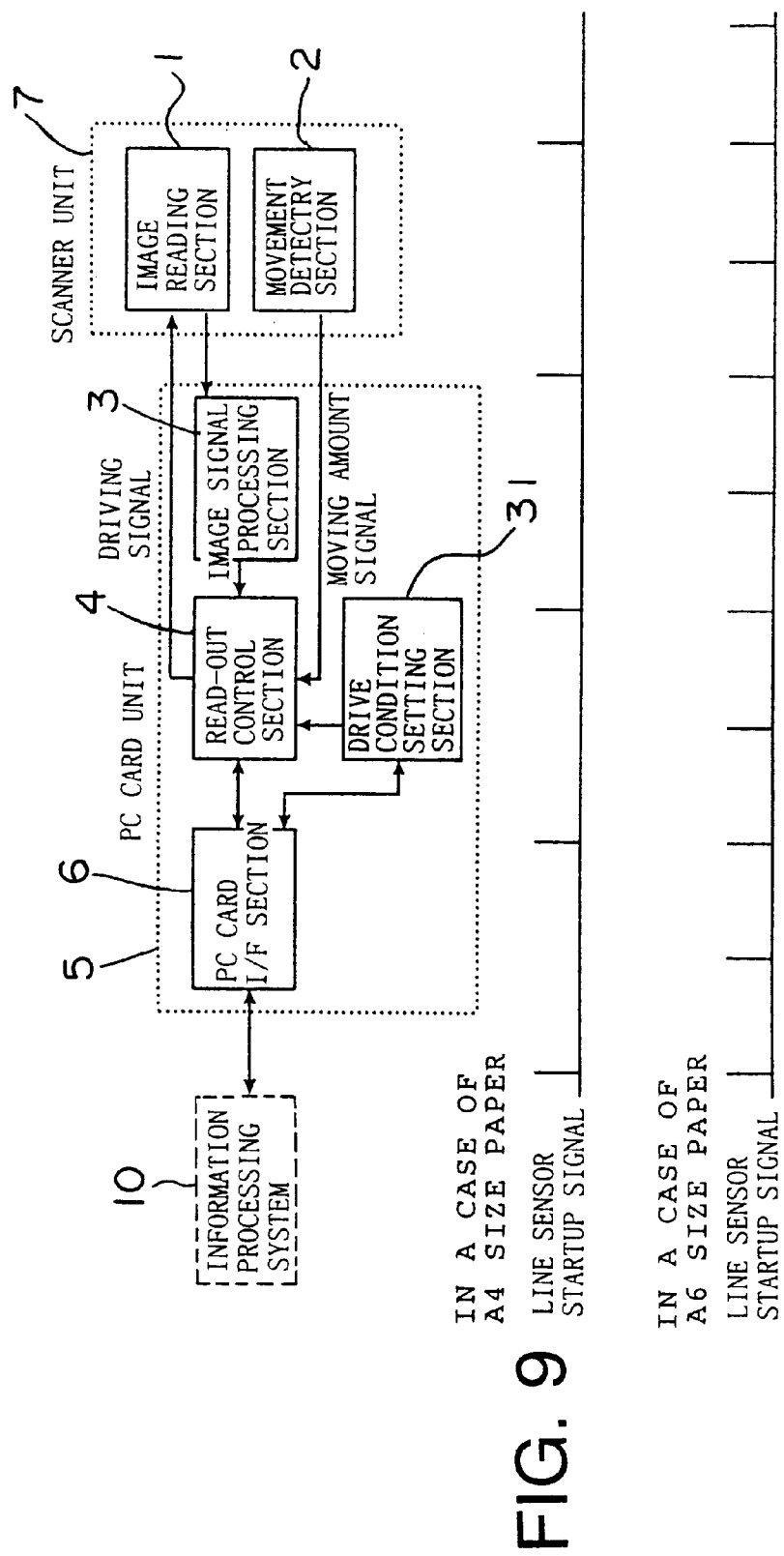
FIG. 9 is a block diagram showing a fourth embodiment of the first aspect of the present invention.

The third embodiment of this aspect of the present invention will be described hereunder with reference to FIG. 8, in which the box-shaped scanning unit 7 of this embodiment further includes an image signal amplifying section 25 adapted to amplify analog image signals from the image reading section 1 in addition to the arrangement of FIG. 1.

In general, since the read-out image signal has a weak magnitude, in an arrangement in which the image reading section 1 and the image signal processing section 3 are separated and connected by the cable means 21, for example, the image signal is attenuated or subjected to the influence of noise, which may result in deterioration of read-out image signals. In order to obviate such defect, the image signals are amplified in the box-shaped unit and then transferred to thereby freely read out the images on the medium to be read.

That is, in this embodiment, the image signal amplifier 25 is interposed between the image reading section 1 of the scanning unit 7 and the image signal processing unit 3 of the PC card unit 5.

This embodiment will be therefore applicable in combination with the above-mentioned second embodiment.

Fourth Embodiment

The fourth embodiment of this aspect of the present invention will be described hereunder with reference to FIGS. 9A, 9B and 9C. In an arrangement of FIG. 9A, a driving condition setting section 31 is further arranged in the PC card unit 5 for setting driving condition of the image reading section 1 arranged in the scanning unit 7 independent from the PC card unit 5. The line sensor constituting the image reading section 1 can read out a seizing signal showing a leading end of the line and a sequential image signal by means of clock of effective pixel. The effective read-out pixel of the image reading section 1 accommodated in one box (scanning unit 7) is set by the driving condition setting section 31 accommodated in another independent box (PC card unit 5) and then driven, by which it becomes possible to perform the read-out with a condition that the size of the sensor in the separate box can be freely changed.

FIG. 9B shows a seizing signal in a case where the read-out size of the line sensor is set to an A4 size paper and FIG. 9C shows a seizing signal in a case where the read-out size of the line sensor is set to an A6 size paper.

Fifth Embodiment

Figure 10:
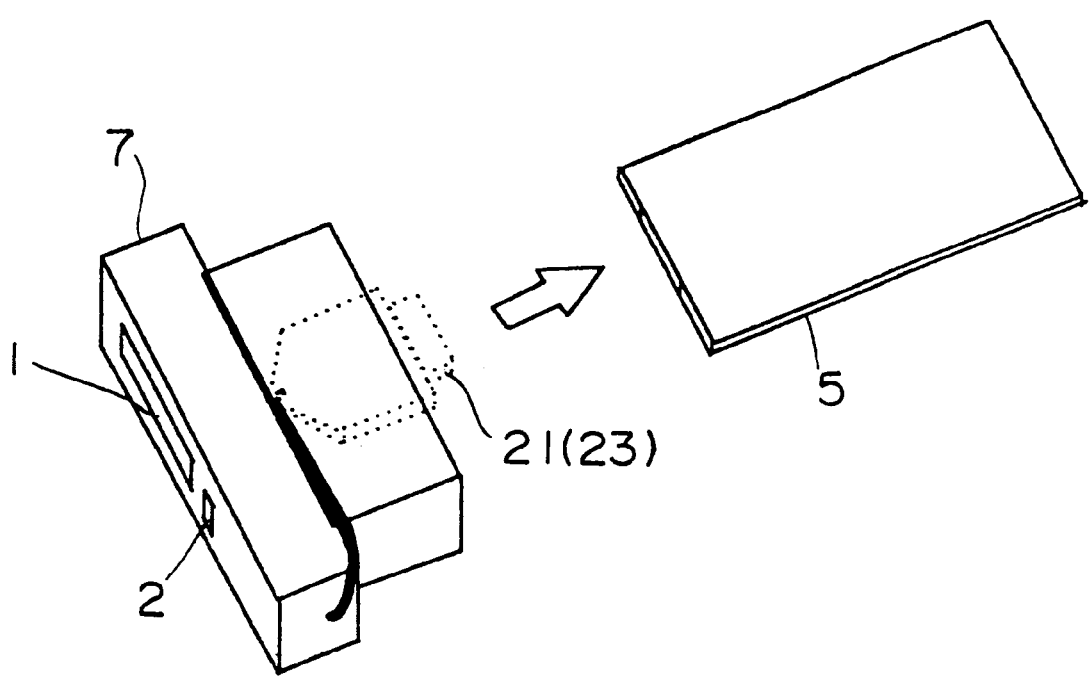
FIG. 10 is a perspective view of a fifth embodiment of the first aspect of the present invention.

A fifth embodiment of this aspect of the present invention will be described hereunder with reference to FIG. 10, which has a structure in which the connecting means 21 including the connector 23 projecting outward from the information processing system 10, as in the second embodiment, can be accommodated in the box (box-shaped scanning unit 7) of the image reading section 1 and the movement measuring section 2. According to this structure, since the connecting means 21 is accommodated in the box-shaped scanning unit 7, the read-out operation can be performed in a condition of the information processing system 10 and the image reading section 1 being integrated, and on the other hand, when the connecting means 21 is not accommodated, the read-out operation can be performed at a portion remote from the apparatus with no limitation in the scanning direction.

Sixth Embodiment

A sixth embodiment of this aspect of the present invention will be described hereunder with reference to FIGS. 11A and 11B, in which a line sensor is used and the order of the read-out data is limited to one direction.

Figure 11A:
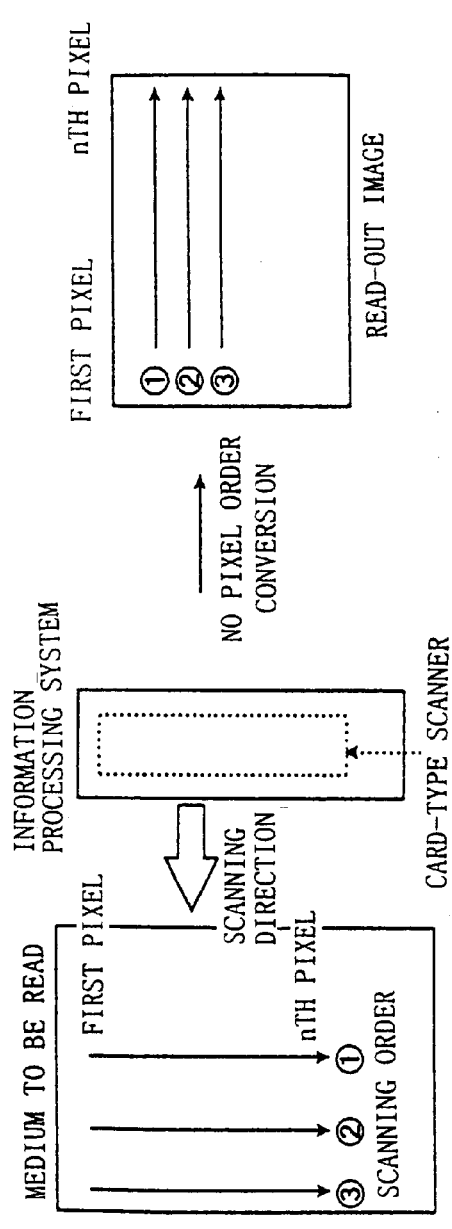
FIG. 11A shows a case of an absence of a pixel order conversion according to a sixth embodiment of the first aspect of the present invention and FIG. 11B shows a case of a presence of a pixel order conversion according to the sixth embodiment.

FIG. 11A shows a state of the copy to be read and the scanning operation of the scanner and the result of the read-out image under the condition that the line sensor of the scanner reads out the data of one line from the upper direction towards the lower direction as viewed in FIG.11A. In the example of FIG. 11A, a read-out image is shown in the right view in which a correct image is read out and displayed.

Figure 11B:
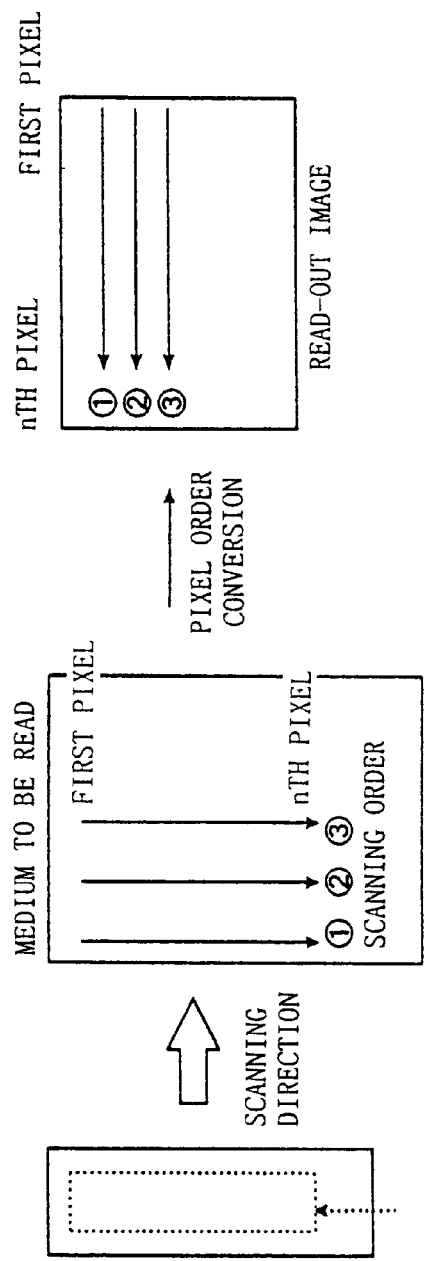

On the other hand, in the case of the same driving of the sensor, when the scanning is performed in the direction of FIG. 11B and a read-out image is displayed as shown in the result of the case of FIG. 11A, the read-out image is displayed as mirror image. This inconvenience will be solved by the following manner.

A data sequence conversion means, not shown, is realized by means of a program on the side of the information processing system by the read-out control section 4 in accordance with the image read-out direction, and then, the information processing system 10 gives a read-out sequence conversion instruction to the read-out control section 4 of the PC card unit 5 before the read-out. The read-out control section 4 executes a sequence inversion processing by corresponding the first pixel to the N-th pixel only in the case of the instruction for the sequence conversion of one line read-out data stored in the buffer of the read-out control section 4. After the above processing, the read-out result of the example of FIG. 11B is transferred to the information processing system 10 as it is, whereby the read-out of the mirror image due to the read-out direction can be prevented.

Seventh Embodiment

Figure 12:
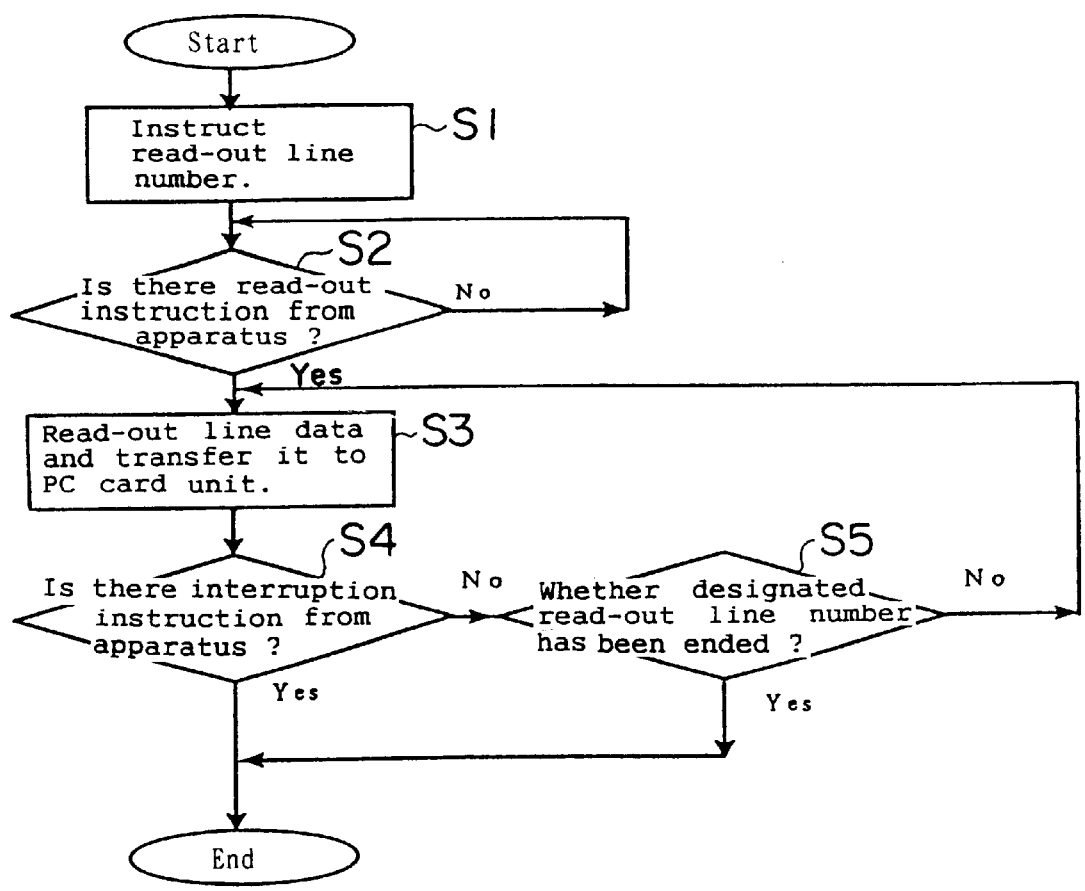
FIG. 12 is a flowchart representing a seventh embodiment of the first aspect of the present invention.

A seventh embodiment of this aspect of the present invention will be described hereunder with reference to FIG. 12.

In a state that the card type scanner and the information processing system are integrated, instructions of read-out start/finish can be performed, in the viewpoint of maneuvability, by a command input of the information processing system 10 or by handling a control button thereof, thereby improving the maneuvability.

That is, a read-out start/finish means, not shown, for instructing the read-out start/finish operation to the read-out control section 4 is provided for the information processing system 10. The sequence flow of the above operations will be described hereunder with reference to the flowchart of FIG. 12.

In step S1, a line number to be read out is instructed to the read-out control section of the card-type scanner from the information processing system.

In step S2, a read-out start instruction is given to the read-out control section through the command inputting or operation of the control button.

In step S3, the read-out control section starts the line inputting and the data is transferred to the information processing system.

In step S4, the processing is ended in a case where an operation interruption is instructed, even if the read-out operation has not reached the instructed line number.

In step S5, the processing is ended at a time when the read-out operation has reached the instructed line number.

According to the flow of the above steps S1 to S5, the instructions for the read-out operation from the information processing system can be realized.

Eighth Embodiment

Figure 13:
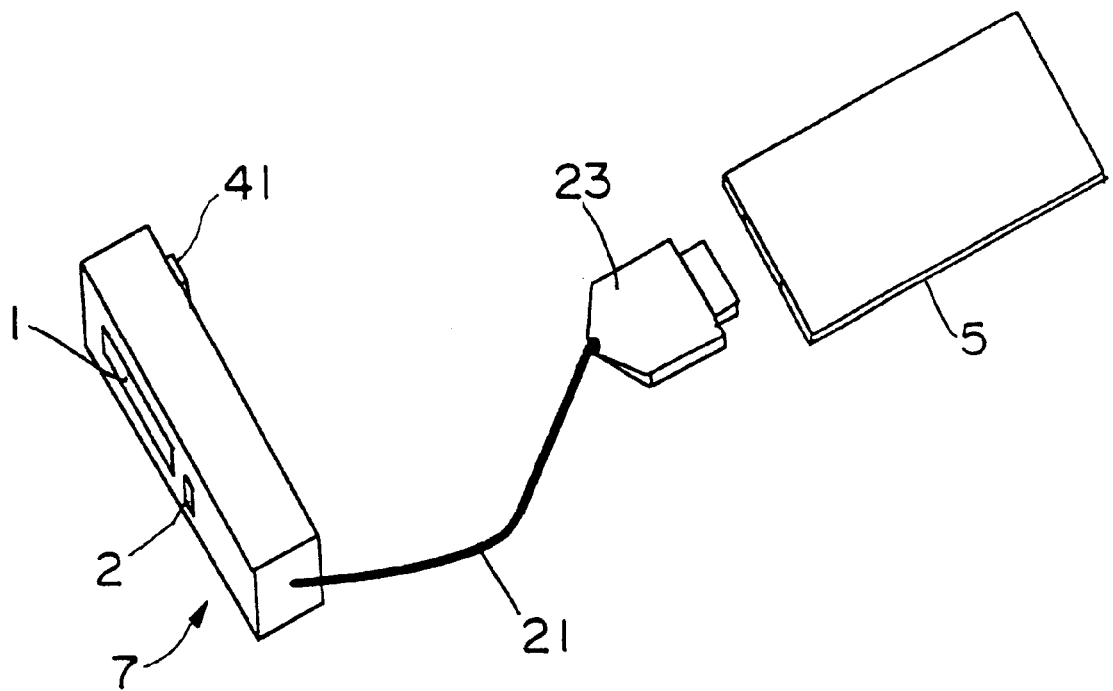
FIG. 13 is a perspective view of an eighth embodiment of the first aspect of the present invention.

An eighth embodiment of this aspect of the present invention will be described hereunder with reference to FIG. 13, which represents an example in which a read-out start/finish instruction means 41 for instructing the read-out start/finish operation to the read-out control section 4 is provided for the scanning unit 7 including the image reading section 1 and the movement measuring section 2 constructed as a unit independent from the PC card unit 5.

In the case of the second embodiment in which the information processing system 10 is operatively connected through the connecting means 21 including such as cable 22, he maneuvability of the apparatus will be improved by directly instructing the operation on the side of the image reading section 1 independent from the information processing system 10 in comparison with the seventh embodiment in which the instruction is made on the side of the information processing system.

Then, the operation mainly performed on the side of the scanning unit 7 can be realized through the instruction by means of a control button provided for the casing of the box-shaped scanning unit 7. The processing flow is substantially the same as that of the seventh embodiment of FIG. 12, and the instruction is given from the instruction means 41 in place of the information processing system 10.

Ninth Embodiment

Figure 14:
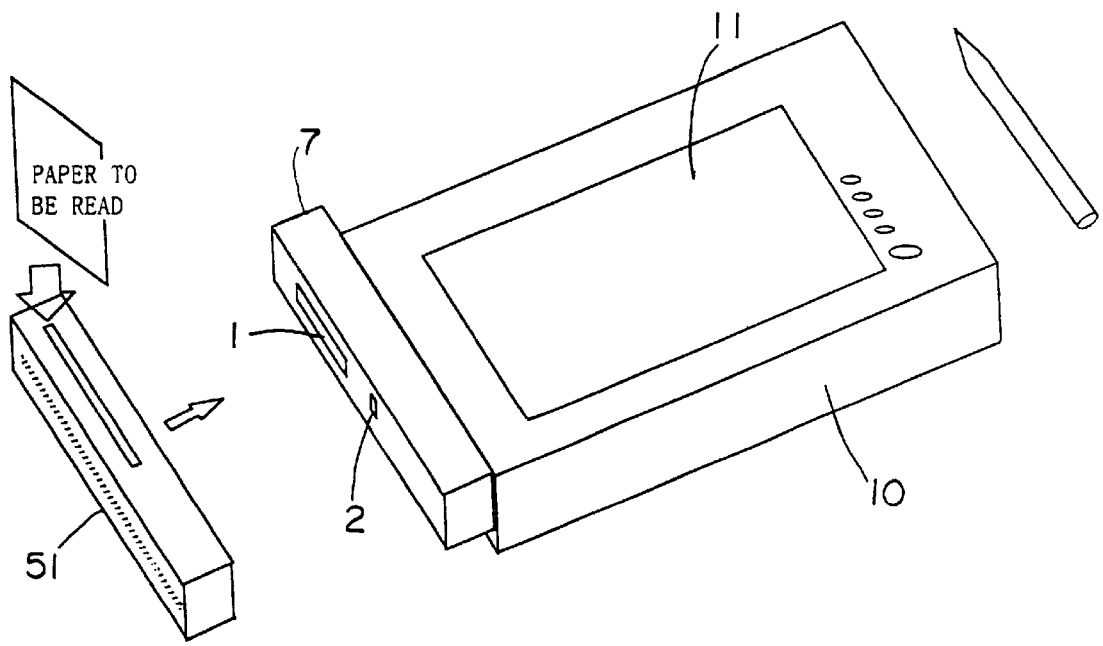
FIG. 14 is a perspective view of a ninth embodiment of the first aspect of the present invention.

A ninth embodiment of this aspect of the present invention will be described hereunder with reference to FIG. 14, in which a read-out assisting means 51 capable of moving a paper to be read in front of the image reading section 1 is detachably mounted to the scanning unit 7 in front of the image reading section 1. The read-out assisting means 51 can read the images by moving the paper in front of the image reading section 1. The read-out assisting means 51 is composed of a casing in which a pair of rollers are arranged and the paper to be read is disposed between the rollers to be movable in front of the image reading section 1.

According to this example, it becomes possible to easily read a small image to be read out, which is difficult to be read by the integrated information processing system, by manually moving the paper between the read-out assisting means 51 and the image reading section 1. The rollers have a structure capable of being rotated with no load. The paper is inserted through a gap formed to the casing in the condition of pressing the rollers against the scanning unit 7. According to the movement of the paper, the rollers are rotated, and the rollers are contacted to the movement measuring section 2 to thereby transfer the moving amount of the paper thereto so as to realize a condition as if the scanning unit 7 is moved and scanned directly on the paper by inserting and moving the paper.

According to the first aspect of the present invention mentioned above, there is provided an image inputting apparatus of the card-type scanner structure usable in combination with the information processing system. When the image inputting apparatus is assembled with the information processing system, the elements other than the image reading unit including the image reading section and the movement (moving amount or distance) measuring section can be accommodated in the information processing system. Accordingly, the images can be read out (scanned) by the projected image reading unit while confirming the display of the information processing system, thus making the structure compact and being convenient for use.

An image inputting apparatus as an image reader according to another (second) aspect of the present invention will be described hereunder by way of preferred embodiments represented by the accompanying drawings.

Figure 15:
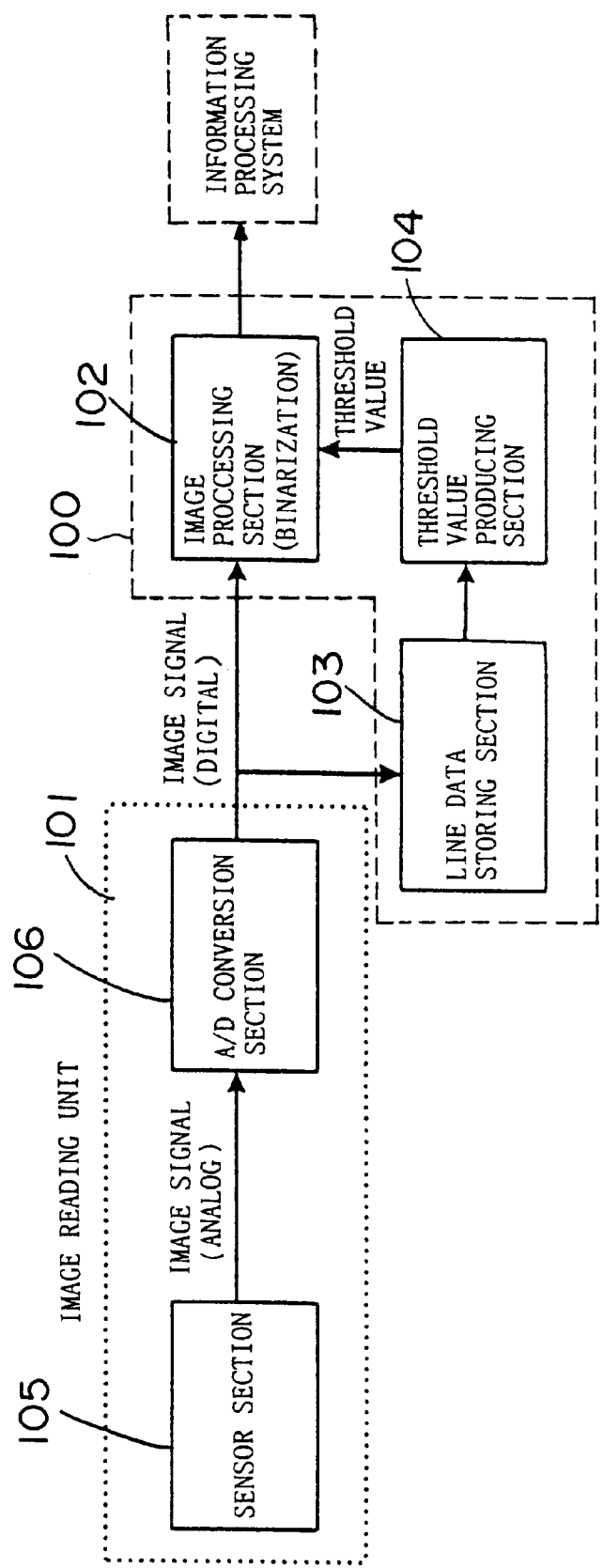
FIG. 15 is a block diagram representing a first embodiment of a second aspect of an image inputting apparatus as an image reader of the present invention.

FIGS. 15 to 20 represent a first embodiment of this aspect of the present invention, in which FIG. 15 is a block diagram of an image inputting apparatus as an image reader of the present invention.

Referring to FIG. 15, the image inputting apparatus includes an image reading unit 101 for optically reading letters or images on a medium to be read and converting the read out letters or images into electric signals and includes an image processing unit 100 for processing the electric signals. The image reading unit 101 includes a sensor section 105 and an A/D conversion section 6, and the image processing unit 100 includes an image processing section 102 for binary coding (binarizing) the electric signal from the image reading unit 101, a line data storing section 103 as an input data storing section for temporarily storing input data regarding white and black portions of the medium from the image reading unit 101 at the line read-out time, and a threshold value producing section 104 for producing a binary coded (binarized) threshold value based on the data in the line data storing section 103 to the image processing section 102.

In the image reading unit 101, letters or images read out by the sensor section 105 and converted into image signals are digitalized by the A/D conversion section 106 and then outputted (for example, in the case of 8 bit, the white portion is shown as 255 and the black portion is shown as 0). The sensor section 105 is so-called a line sensor composed of a liner light emitting portion to the image and a linear light emitting portion comprising a CCD (charge coupled device) receiving a light reflected from the image, and such line sensor has been utilized for a known facsimile.

Figure 16:
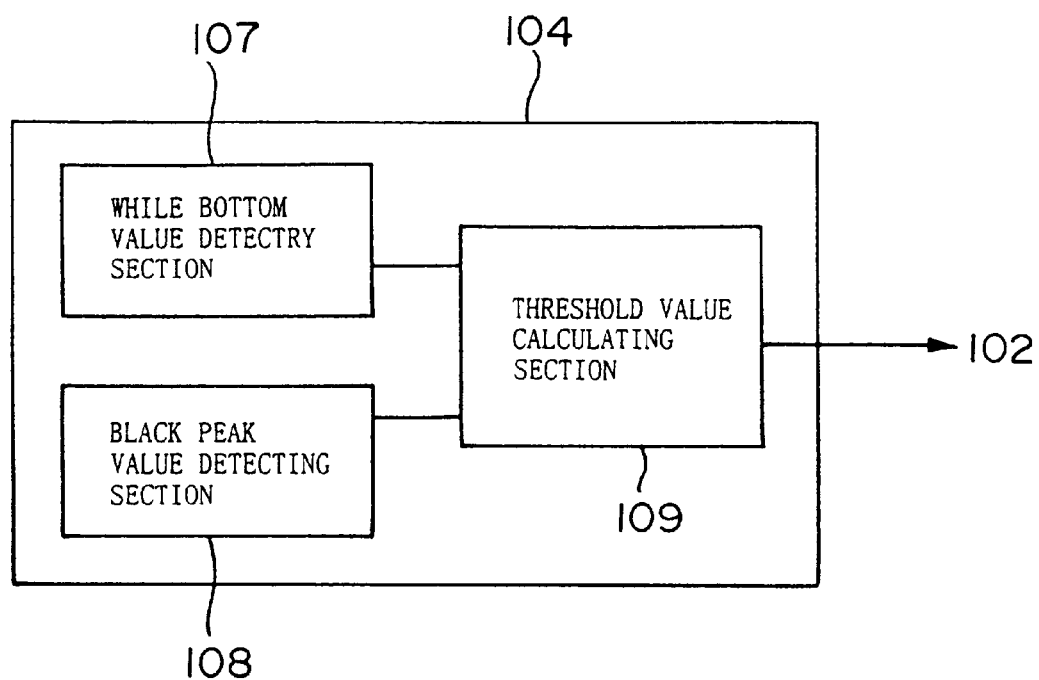
FIG. 16 is a diagram showing a detail of a threshold value producing section of the apparatus shown in FIG. 15.

The threshold value producing section 104 includes a case where only the input data of the white portion is utilized and a case where only the input data of the black portion is utilized. In the former case, the threshold value producing section 104 includes, as shown in FIG. 16, a white bottom value detecting means 107 for detecting a white bottom value as the minimum value in the input data of the white portion to be a reference read out and a threshold value calculation means 109 for producing the threshold value S in accordance with the white bottom value WB detected by the white bottom value detecting means 107, which is shown as the following equation (1).

$$S = \alpha \times WB (0 < \alpha < 1) \qquad (1)$$

(α: coefficient for determining the threshold value)

Figure 17:
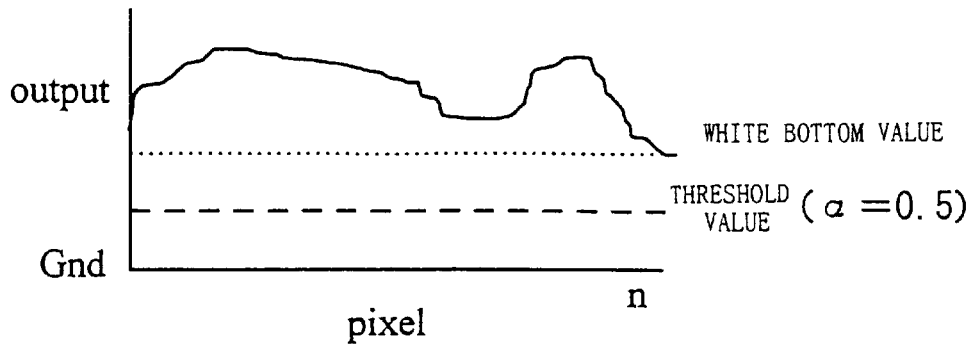
FIG. 17 is a graph showing a threshold value producing process in accordance with an equation (1) in the specification.

For example, FIG. 17 shows a graph representing a relationship between an input waveform and a threshold value to be determined, and as shown in FIG. 17, in a case of an image reading in which a black input level has less variation, which is hence inputted as 0 (zero) level, black letters are all regarded as 0 even if the paper to be read out be changed. In such case, only the input data of the white portion is utilized.

In the input data storing section 103, one line input data of the white portion outputted as digital value is stored and the input data is then transferred to the threshold value producing section 104, in which the threshold value is produced by the input data and then transferred to the image processing section 102.

That is, it is first to read out a white paper as the reference, then to store this input data in the input data storing section and, thereafter, to detect the white bottom value (WB) being the minimum value in the white input data by the white bottom value detecting means. Then, in accordance with the equation (1) mentioned above, the threshold value (S) is calculated. Since the threshold value S=α×WB (0<α<1), the binary coded threshold value can be produced without exceeding the white level.

A case to be utilized for the threshold value production of the black portion will be described hereunder in addition to the white portion threshold value production.

In such case, as shown in FIG. 16, the threshold value producing section 104 further includes a black peak value detecting means 108 for detecting a black peak value as maximum value in the input data of the black portion to be a reference read out. The threshold value calculation means 109 of the threshold value producing section 104 then produces a threshold value S in accordance with the white bottom value WB detected by the white bottom value detecting means 107, and the black peak value BP detected by the black peak value detecting means 108, which is shown as the following equation (2).

$$S = \alpha \times (WB - BP) + BP (0 < \alpha < 1) \qquad (2)$$

(α: coefficient for determining the threshold value)

A threshold value is first produced by inputting (reading) a paper (white portion) as a reference and the black portion, and it is desired to use a white paper with no description as the white portion and to use a black paper having the entire surface applied with black color as the black portion. Further, in a case where black paper (black portion) is not stored in an entire area of the sensor, an input data of the black portion of a black reference paper, having entire black surface, separately prepared, is regarded as an input data of the black portion of the paper to be read out (inputted). This will be said, in the present invention through not shown, as a black peak value storing means for storing the black data including the black peak value, which is preliminarily determined through experiments.

In the input data storing section, one line data of the white and black portions inputted as digital values are stored and the input data are transferred to the threshold value producing section 104. In the threshold value producing section 104, the threshold value is produced by using the input data stored in the input data storing section in accordance with the equation (2), which is then transferred to the image processing section 102.

Figure 18:
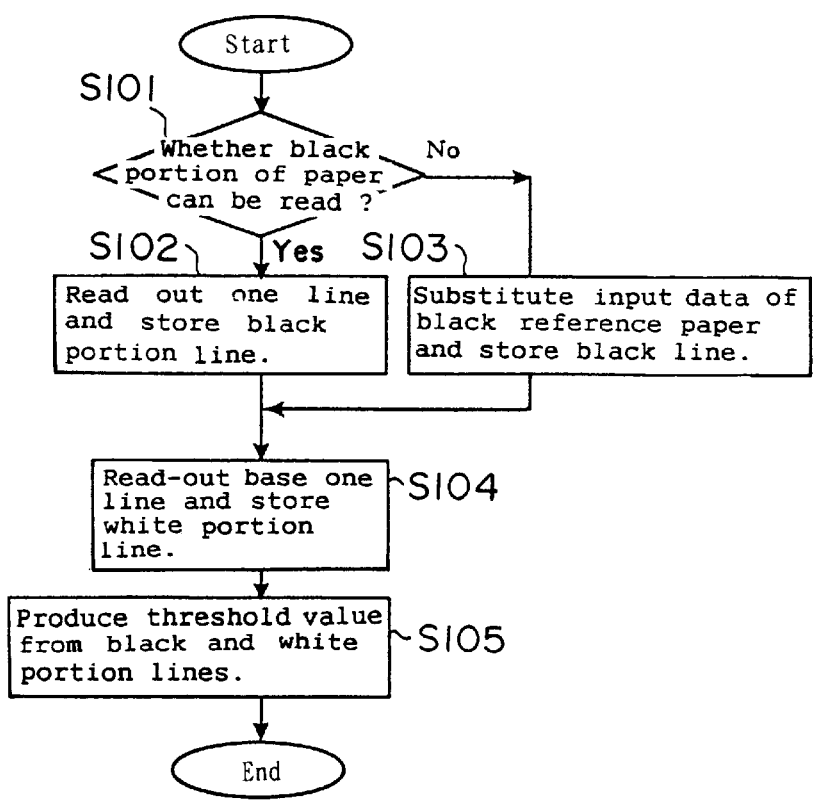
FIG. 18 is a flowchart showing the threshold value producing process.

The above mentioned processing will be described with reference to the flowchart of FIG. 18.

In step S101, it is discriminated whether it is possible to input (read) the black portion of the paper or not.

In step S102, if possible in step S101, one line black portion is read out and stored.

In step S103, if impossible in step S101, the input data of the black portion of the separately prepared black reference paper (black entire surface), which is preliminarily stored in the black peak value storing means, is stored as the black portion line in place of the input data of the black portion of the paper to be inputted.

In step S104, after the steps S102 and 103, one line of the white portion of the reference paper is read out, which is then stored as the white portion line.

In step S105, a threshold value is produced from the white and black data in accordance with the equations (1) and (2) mentioned above.

Further, it may be possible to first read out the white data and then the black data.

Figure 19:
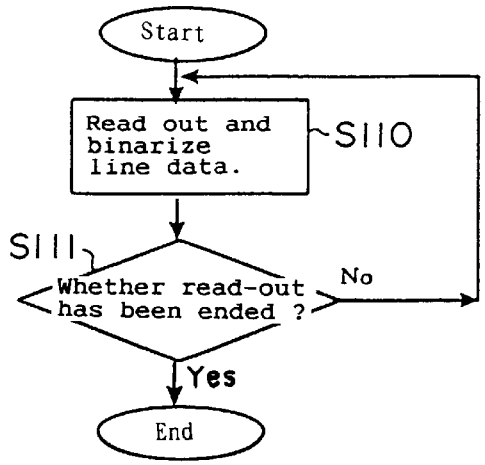
FIG. 19 is a flowchart showing a binary coding process (binarization) by the produced threshold value.

After the production of the threshold value, the image read-out will be performed in accordance with the flowchart of FIG. 19.

In step S110, letters or images are read out in the image reading unit 101 and the binary coding processing is performed in the image processing section 102 with reference to the produced threshold value for processing the binarization.

In step S111, the above processing is continued till the time when the entire reading of the paper has been completed.

Figure 20:
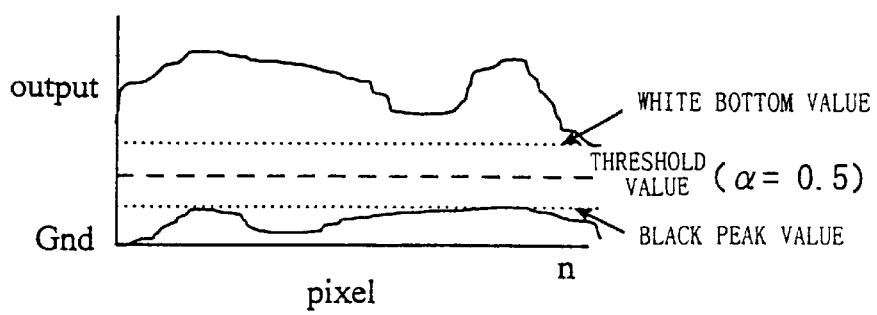
FIG. 20 is a graph showing a threshold value producing process in accordance with equation (2) in the specification.

FIG. 20 is a graph showing a relationship between the input waveform and the determined threshold value. In a case where the input level of the black portion varies (not flat), or images which cannot be inputted as 0 (zero) level are to be read, the threshold value is produced by using the white bottom value (WB) as the input minimum value and the black peak value (BP) as the black input maximum value in accordance with the equation (2) mentioned above. According to the use of the white bottom value (WB) and the black peak value (BP), the correct binary coded threshold value can be always produced.

In the actual image inputting processing, in the image processing section, the digital image signal from the image reading unit is binary coded by using the threshold value in the threshold value producing section. In this processing, since the threshold value produced in the threshold value producing section is produced by the input data in which the white and black portions are inputted (read out), the binary coding can be correctly performed.

Figure 21:
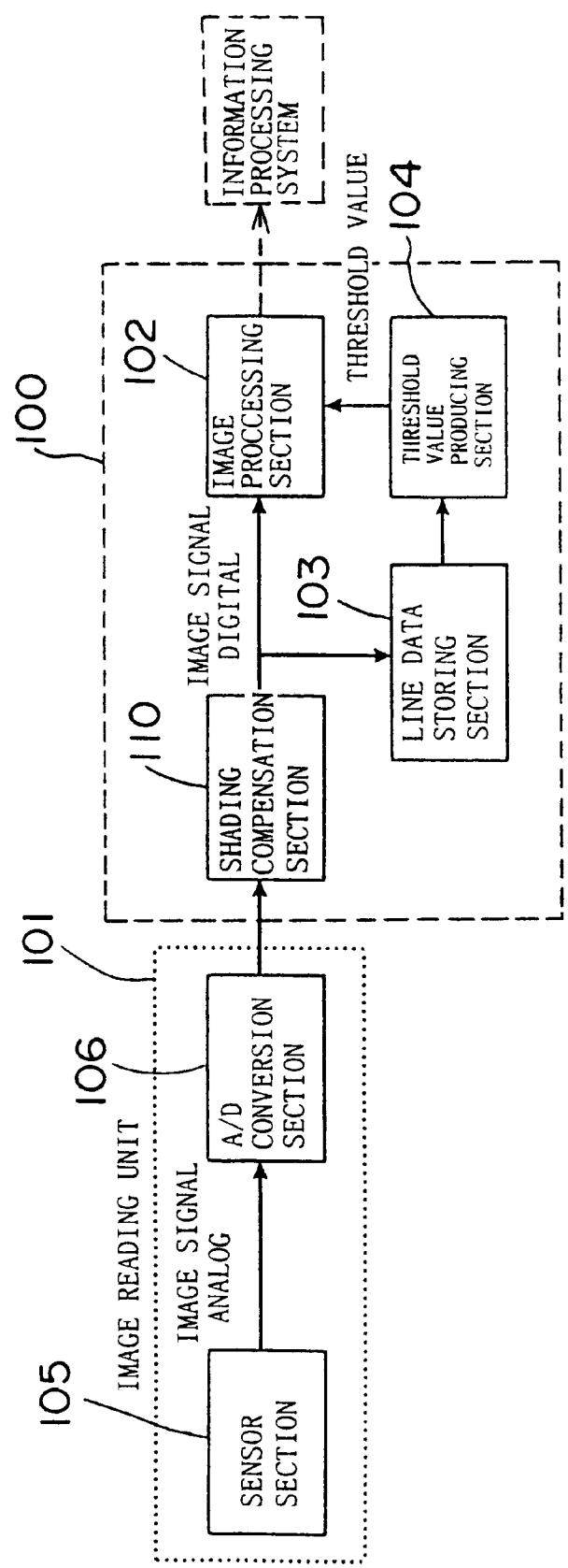
FIG. 21 is a second embodiment of the second aspect of the present invention including a shading compensation processing for compensating an input data level.

FIG. 21 represents a second embodiment of this aspect of the present invention, which shows a block diagram of an image inputting apparatus of the present invention.

Referring to FIG. 21, the image inputting apparatus further includes a shading compensation section 110 in addition to the sections of the first embodiment of FIG. 15. That is, the image inputting apparatus of this second embodiment includes an image reading unit 101 for optically reading letters or images on a medium to be read and converting the read out letters or images into electric signals and an image processing unit 100 for processing the electric signals. The image reading unit 101 includes a sensor section 105 and an A/D conversion section 6, and the image processing unit 100 includes a shading compensation section 110, operatively connected to the A/D conversion section 6, as level compensation means, for compensating the image signal from the image reading unit 101, an image processing section 102 for binary coding the electric signal after the compensation in the shading compensation section 110, an input data storing section 103 for storing the input data after the shading compensation at the line read-out time, and a threshold value producing section 104 for producing a binary coded threshold value based on the data in the input data storing section 103 to the image processing section 102.

In the image reading unit 101, letters or images read out by the sensor section 105 and converted into image signals are digitalized by the A/D conversion section 106 and then outputted (for example, in the case of 8 bit, the white portion is shown as 255 and the black portion is shown as 0). The output from the image reading unit 101 is converted into an output from which shading or the like has been removed by the shading compensation section 110 a preliminarily inputted base value is stored as a white shading compensation value and the inputted image signal is always converted and outputted in accordance with the following equation (3).

$$Y(i)=255X(i)/WW(i) \qquad (3)$$

(X(i): input image signal, Y(i): image signal after compensation, /WW(i): white shading compensation value)

The converted image signal is processed in substantially the same manner as that mentioned with reference to the first embodiment of FIG. 15. When the white and black portions are inputted (read out), the data storing section 101 stores one line output as digital value and the inputted data is then transferred to the threshold producing section 104.

In the threshold producing section 104, the threshold value is produced by using the input data stored in the input data storing section 103, which is then transferred to the image processing section 102. As mentioned before, the threshold value producing section includes the cases of the threshold value production by using the white input data in accordance with the equation (1) and by commonly using the black input data in accordance with the equation (2).

In the image processing section 102, the digital image signal from the image reading unit 101 is binary coded by using the threshold value from the threshold value producing section 104. Although, in this embodiment, an example of the white shading compensation is mentioned, the black shading compensation will be performed by substantially the same manner as that mentioned above.

Figure 22:
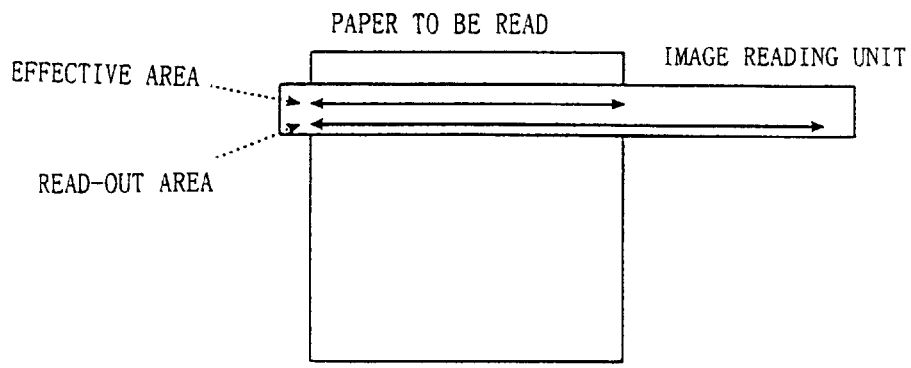
FIG. 22 is a view showing a third embodiment of the second aspect of the present invention including an effective area indication processing for an input data.
Figure 23:
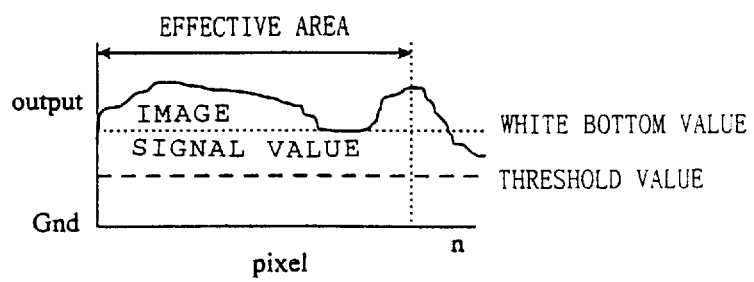
FIG. 23 is a graph showing the case of indicating the effective area.
Figure 24:
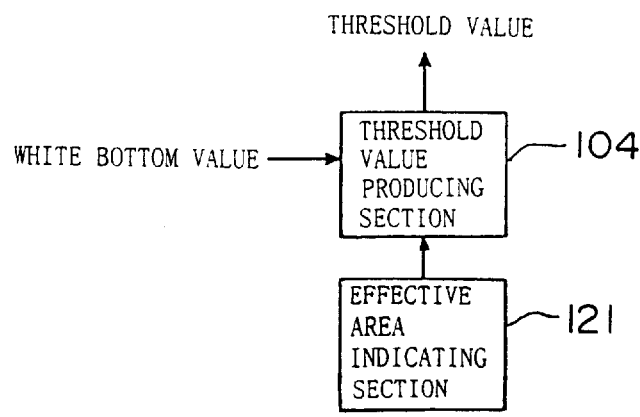
FIG. 24 is a block diagram for indicating the effective area.

A third embodiment of this aspect of the present invention will be described with reference to FIGS. 22 to 24.

In a case where a paper (as a medium to be read) has a length shorter than the length of reading area of the image reading unit, there may cause a case where, even if the line input data is obtained, a portion not to be read out is selected and a correct threshold value is hence not produced. In order to obviate such defect, in this embodiment, an effective area indication section 121 is provided (FIG. 24) as area indication means for defining a usable area of the input data as a reference. The effective area indication section 121 uses, as input data value, only the data of the portion defined on a preliminarily designated line and, by using such input data value, the threshold value is produced. In this manner, an optimum binary coded threshold value can be produced even in the use of a paper having a length shorter than the line length of the image reading unit.

According to the above aspect of the present invention, even in the case of the input data from the sensor having irregular sensitivity due to an influence of a sensor or lightening means, the minimum value (white bottom WB) of the input level of the base (white portion) of the paper to be read out, and in addition as occasion demands, the maximum peak value (black peak value BP) of the input level of the black portion are preliminarily inputted and stored as reference values. Furthermore, in the case where the black portion of the paper is not stored in the entire area of the sensor, the input data of the black portion of the separately prepared black portion reference paper (all black surface) is estimated as the black portion of the paper to be inputted. The threshold value is produced from this reference value and the determined threshold value never exceed the white and black levels, and accordingly, the correct binary coding can be always performed.

Furthermore, according to the present invention, the irregular sensitivity due to the sensor or lightening means is subjected to the shading compensation processing through the compensation with the preliminarily stored white and black input levels. According to such shading compensation processing, the dynamic range of the input throughout the entire area of the sensor can be widened, thus being effective. The minimum value (white bottom WB) of the input level of the base (white portion) of the paper to be read out, which has been subjected to the shading compensation processing, and in addition as occasion demands, the maximum peak value (black peak value BP) of the input level of the black portion are preliminarily inputted and stored as reference values. Furthermore, in the case where the black portion of the paper is not stored in the entire area of the sensor, the input data of the black portion of the separately prepared black portion reference paper (all black surface) is estimated as the black portion of the paper to be inputted. The threshold value is produced from this reference value and the determined threshold value never exceed the white and black levels, and accordingly, the correct binary coding can be always performed. In addition, in a multi-value coding processing using a dither (defined by combination of a plurality of binary coded threshold values in a certain area), the processing can be always performed with the correct threshold value.

More concretely, in a case of large variation of the black portion input, the threshold value is produced in the threshold value producing section as represented by the former equation (2) [threshold value S=α×(white bottom value WB−black peak value BP)+BP (0<α<1)]. According to this equation, an optimum threshold value not exceeding the white and black levels can be produced. Particularly, the case of (α=0.5) corresponds to a case where a maximum margin is set to the white and black levels.

In a case of less variation of the black input level and where an image inputted to 0 (ground) level is read out, the black portion of a letter can be always estimated as 0 (zero) regardless of the kind of the paper to be read out. Then, when the threshold value is produced in the threshold producing section in accordance with the former equation (1) [threshold value S=α×white bottom value WB (0<α<1)], the optimum threshold value not exceeding the white and black levels can be produced. Further, the case of (α=0.5) corresponds to a case where a maximum margin is set to the white and black levels.

Furthermore, in the case where the paper to be read out has a length shorter than the line length of the image reading unit, even if the white bottom value is obtained, a portion not to be read out will be selected. This defect can be solved according to the present invention by producing the threshold value by using the white bottom value of the defined portion on the preliminarily indicated one line. According to this manner, the optimum binary coded threshold value can be produced even in the case of the paper having a length shorter than the line length of the image reading unit.

According to the second aspect of the present invention mentioned above, there is provided an image inputting apparatus particularly provided with an improved threshold value producing means. Therefore, in the case where the read-out values largely vary due to the irregularity of the sensor sensitivity or lightening means, the threshold value can be properly produced and hence the binarization (binary coding) processing can be always accurately performed.

In a further (third) aspect of the present invention, there is provided an image inputting apparatus including an image reading unit and an image processing unit provided particularly with means for producing a pixel value (gray level) histogram distribution.

Further, it is to be noted that like reference numerals which are used for the above-mentioned embodiments are used commonly to units or sections in the drawings of the following embodiments of this aspect.

A first embodiment of this aspect will be described hereunder with reference to FIG. 25.

The image inputting apparatus of this embodiment is basically composed of an image reading unit 100 and an image processing unit 102 as in the former embodiment of FIG. 15. In the embodiment of FIG. 25, a pixel value (gray level) histogram distribution producing section 150 is provided in the image processing unit 102, and the pixel value histogram distribution producing section 150 is a means for producing a pixel value histogram distribution in accordance with an input data (analog data) from the image reading unit 101. A threshold value producing section 104 in this embodiment is adapted to produce a binarized (binary coded) threshold value from a white peak value of a base portion of a paper to be read and a black peak value of a letter (image) portion of the paper, and the produced threshold value is inputted in an image processing (binarizing) section 102.

The image reading unit 101 includes a sensor section 105 and an A/D conversion section 106 as in the former embodiment of FIG. 15, and the sensor section 105 outputs an analog signal in accordance with a pixel value of an image read out from a medium to be read.

Figure 26:
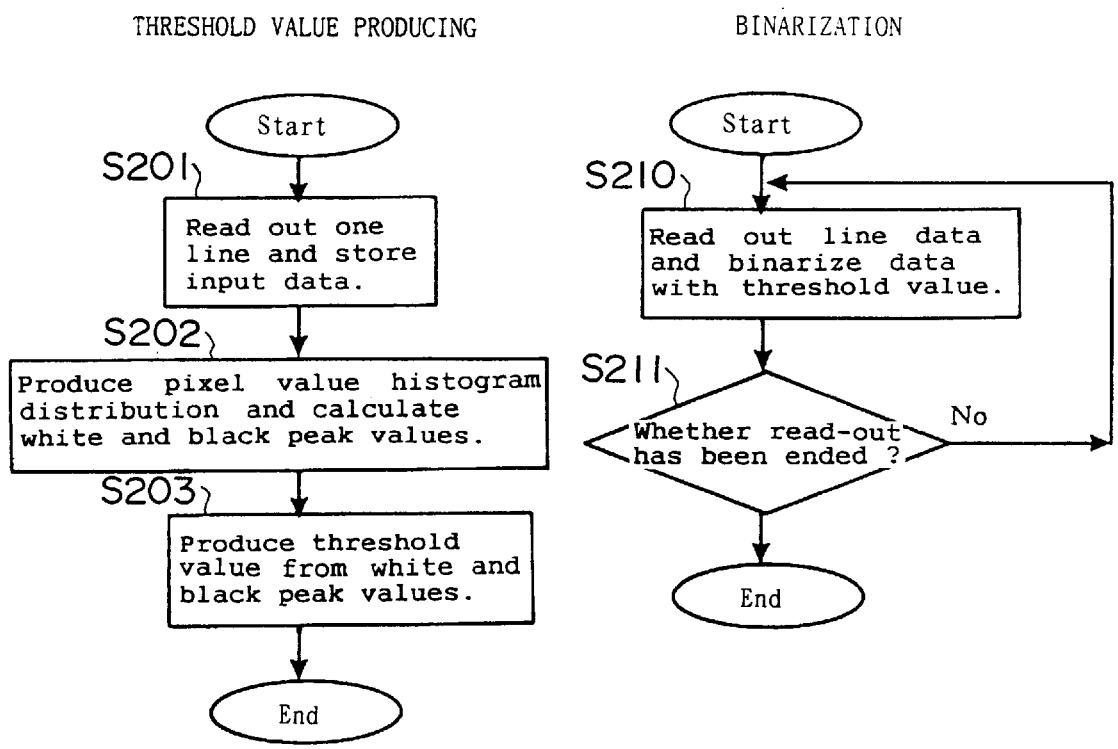
FIG. 26 is a flowchart showing an image read-out processing according to the first embodiment of the third aspect of the present invention.

FIG. 26 is a flowchart showing a flow of the binarization of this embodiment, in which the threshold value producing processing and the binarization processing are executed.

With reference to FIG. 26, the following steps will be performed first for producing the threshold value.

In step S201, one line data of an image of a white portion (base portion) of the medium (paper or copy) to be read is read out and inputted as data, which is stored in the line data storing section.

In step S202, the data is inputted in the pixel value histogram distribution producing section, in which the pixel value histogram distribution is produced from the pixel values of the respective pixels of the inputted data.

In step S203, in the threshold value producing section, the white peak value of the base portion of the medium and the black peak value of the letter portion of the medium are obtained in accordance with the pixel value histogram distribution and a threshold value is produced by the white and black peak values, which is then sent to the image processing (binarizing) section.

In a case where an area of the medium to be read out is all black or white portion, the white peak value or black peak value is not obtained in such one line read-out step, and in such case, the threshold value is produced by using a white maximum value (8 bit: 255) and a black minimum value (8 bit: 0) which are preliminarily produced, and subsequent processing is performed with the thus produced threshold value.

With reference to FIG. 26, the following steps will be performed next for the binarization.

In steps S210 and S211, the digital image signals from the image reading unit are binarized in the image processing (binarizing) section by using the threshold value produced in the threshold value producing section in accordance with the above steps. The threshold value from the threshold value producing section is produced in accordance with the input data of the white and black portions of the medium to be read out, and accordingly, the thus produced threshold value is the most optimum value and, hence, the binarization based thereon is correctly performed.

Figure 25:
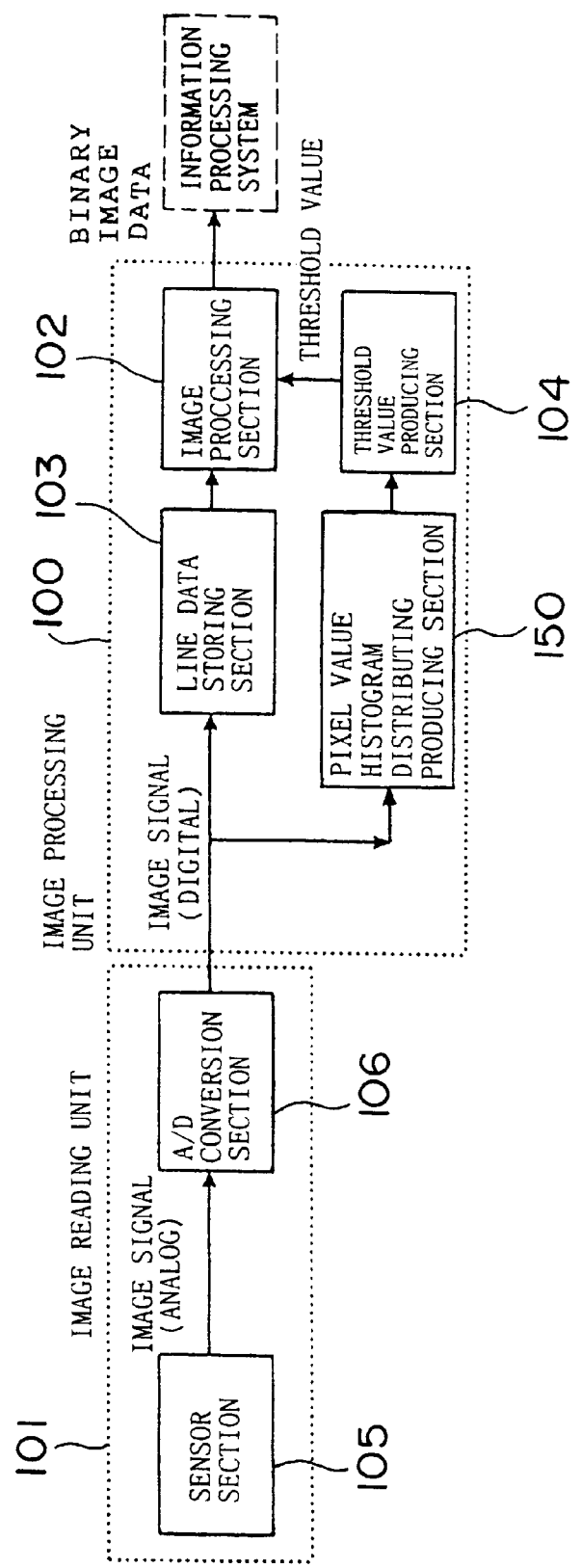
FIG. 25 is a block diagram representing a first embodiment of a third aspect of the present invention.
Figure 27:
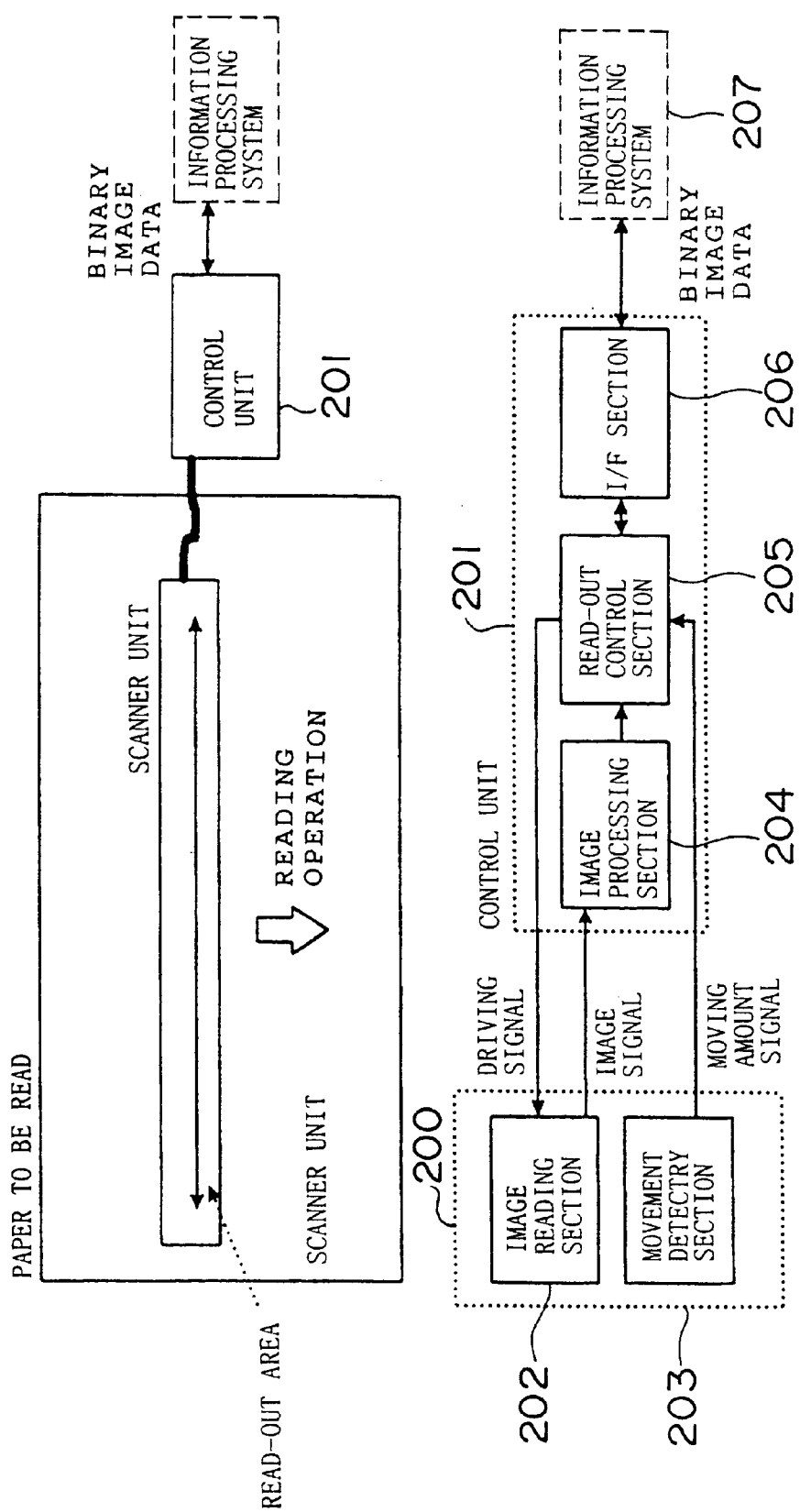
FIG. 27 is a block diagram showing a basic structure for the image inputting apparatus (image reader) according to the third aspect of the present invention.

FIG. 27 is a diagram of a pen-type scanner as one example using the image inputting apparatus of FIG. 25, in which a copy (medium to be read) is read out by closely contacting the image reading unit to the copy.

The pen-type scanner generally comprises an image reading unit having a pen-type structure and an image processing unit to which an information processing system is connected as in the embodiment of the card-type scanner mentioned hereinbefore.

The pen-type scanner is moved and scanned on the copy to be read out and the obtained input data is binarized in accordance with the threshold value to thereby output a binarized image data. The image reading unit 200 of the pen-type scanner of this embodiment is provided with an image reading section 202 and a movement detecting section 203. A control unit 201, as the image processing unit, is provided with an image processing section 204, an image read-out control section 205 and an I/F section. 206. A binarized image data is sent to an information processing system 207 from the read-out control unit 201. The details of the processings of the pen-type scanner of the structure mentioned above will be described hereinlater.

Figure 28:
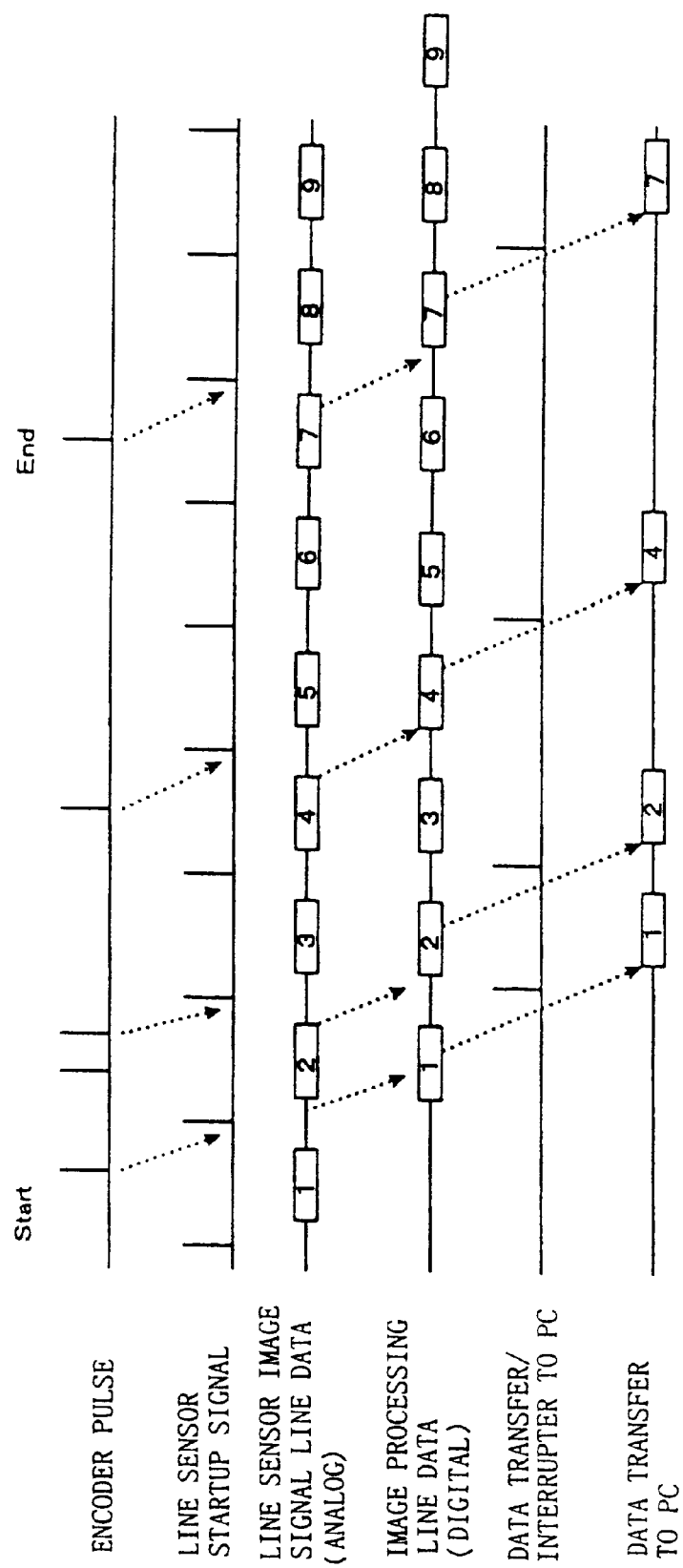
FIG. 28 is an image read-out time chart of the apparatus.

FIG. 28 is a time chart, similar to FIG. 5 mentioned with reference to the card-type scanner of the present invention, showing a flow of control at the time of the image read-out by the pen-type scanner shown in FIG. 27 and a flow of the input data.

With reference to FIG. 28, an encoder pulse corresponds to a moving amount signal outputted from the movement (moving amount or distance) measuring section 203, and a line sensor startup signal is a signal generated per one driving cycle of the line sensor, on the basis of which signal transferring from the line sensor starts and which corresponds to a driving signal in FIG. 27. A line sensor image signal is an image signal generated from the line sensor in response to the line sensor startup signal. An image processed signal is an image signal which has been subjected to the binary coding (binarization) processing.

The transfer/interruption of the data into the inputting apparatus is executed by the image reading unit 200 to an information processing system 207 at a time when the image data is transferred from the image reading unit 200 to the external information processing system 207. The detail of this processing will be described hereinlater. The control of the read-out processing and flow of the data will be described hereunder with reference to FIGS. 25 to 28.

The image reading section 202 is provided with a line sensor, a lightening means such as LED or cold cathode tube and a lens and performs the image reading through the close contact to the medium such as paper to be read out. During the reading of the image (letter), the lightening means is lightened and the line sensor starts to read out the image by means of the startup signal, whereby reflected light amounts at various portions on the sensor are converted into electric signals which are then outputted as analog signals. The movement measuring section 203 serves to convert the moving amount of the sensor on the medium by means of an encoder into pulse signals (movement pulse), which are then outputted. According to this process, the relative movement amount of the image inputting apparatus with respect to the medium to be read is detected. The image signal processing section 204 operates to digitalize the image signal from the image reading section 202 through the A/D conversion circuit and to perform the binarization image processing by using the threshold value determined by the pixel value (gray level) histogram distribution. In the control unit 201, the entire read-out control and the data transferring to the information processing system are executed. The startup signal to the line sensor is always generated during the medium read-out time (inputting time), and the line data after the image processing (image data)is stored in a buffer inside the image inputting apparatus.

When the read-out control section 205 detects the movement pulse (encoder pulse) from the movement measuring section 203, it performs an interruption to the information processing system 207 and transfers the image processed line data stored in the buffer. Only one movement pulse is generated in a steady operation per one driving cycle of the line sensor (line sensor image signal 1 in FIG. 28). When the binarization processing is performed, the data transfer/interruption is executed from the image reading unit to the information processing system and the image data is transferred thereto.

However, in a case where the movement pulse is detected twice or more than two times during one driving cycle of the line sensor, the read-out control section discriminates that the scanner movement more than the read-out capacity of the scanner is caused and the data of only one movement pulse is transferred. In the example of FIG. 28, this pulse corresponds to the line sensor image signal 2, in which two encoder pulses are generated between line sensor startup signals. On the other hand, a case where no movement pulse is detected per one driving cycl of the line sensor represents a case that the scanner is not moved, which corresponds to the line sensor image signal 3 in FIG. 28 and in which no encoder pulse appears. In such case, the image processed line data stored in the buffer is revoked and the data of the next read-out line (line sensor image signal 4) is stored.

The I/F (interface) section 206 is an electrical interface means for the information processing system 207 connected to the image reading unit 200 and performs an interruption or data access to the information processing system. The binary coded (binarized) data transferred to the information processing system is displayed on a display section thereof, and accordingly, an operator can confirm the image data now reading through the display section.

Figure 29:
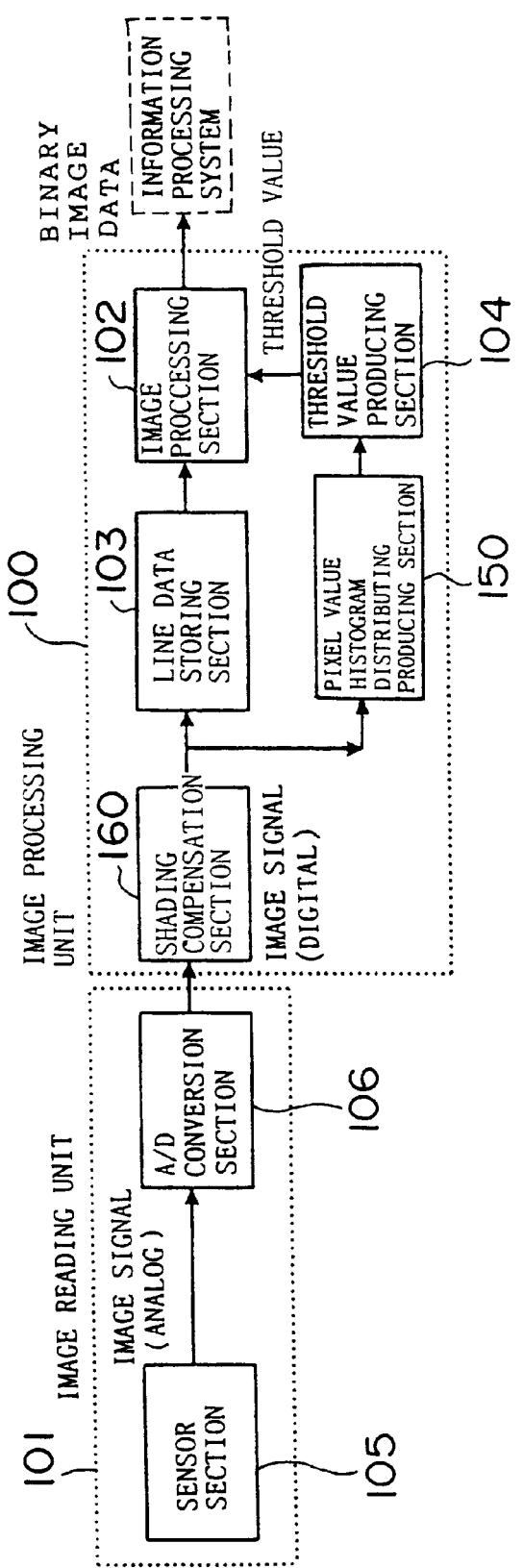
FIG. 29 is a block diagram representing a second embodiment of the third aspect of the present invention.

FIG. 29 represents a diagram of a second embodiment of the image inputting apparatus of the present invention of this aspect, and this embodiment further includes a shading compensation section 160 in addition to the embodiment of FIG. 25.

That is, the image inputting apparatus of FIG. 29 is basically composed of an image reading unit 101 and an image processing unit 100 operatively connected to the image reading unit 100, the image processing unit 100 being operatively connected to an information processing system, not shown in FIG. 29.

That is, the image reading unit 101 operates to optically read out an image on a medium to be read and convert the read out image into an electric image signal, and the image processing unit 100 includes a shading compensation section 160 performing the shading compensation to the image signal from the image reading unit 101, an image processing section (binarizing section) 102 for binary coding the compensated image signal, an input data storing section 103 storing the compensated input data, a pixel value (gray level) histogram distribution producing section 150 for producing the pixel value histogram distribution from the data from the input data storing section 103, and a threshold value producing section 104 for producing a binarized threshold value, to the image processing section 102, from the white (base) peak value and the black peak value of the pixel value histogram.

The image reading unit 101 includes a sensor section 105 and an A/D conversion section 106 as in the former embodiment of FIG. 25, and the sensor section 105 outputs an analog signal in accordance with a pixel value of an image read out from a medium to be read out, for example, in the case of 8 bit, 255 output for white and 0 output for black. The output from the image reading unit 101 is converted to an output, in the shading compensation section, having no surface irregularity of the medium such as paper. The preliminarily read out base value is stored as white shading compensated value and the inputted image signal is always converted by the following equation (4) and then outputted.

$$y(i)=255x(i)/ww(i) \qquad (4)$$

(y(i): signal after compensation; x(i): input image signal)

The image signal converted by the above equation (4) is binarized (binary coded) in the manner substantially the same as that in the above embodiment of this aspect, and hence, the one line input data after the shading compensation is stored in the input data storing section 103. Further, the threshold value is produced from the input data in the manner substantially the same as that in the above embodiment. Further, although the white shading compensation is mentioned herein, the black shading compensation may be also performed.

FIG. 30A includes graphs showing an image reading function according to a third embodiment of the present invention of this aspect, in which a relationship between an input waveform of the base (white portion), a pixel value histogram distribution and a threshold value to be determined. The left side graph of FIG. 30A shows an input value of the one line read-out signal including the base(white portion) and black portion (letter or image) of a copy as a medium to be read, in which the axis of abscissa represents a pixel in the horizontal direction of the medium and the axis of ordinates represents a pixel value. The right side graph in FIG. 30A shows the pixel value histogram distribution, in which the axis of abscissa represents a pixel value and the axis of ordinates represents a frequency of the pixel value generation.

FIG. 30B is a block diagram of the threshold value producing section of this embodiment, which includes a white peak value (WP) detecting means, a black peak value (BP) detecting means and a threshold value calculating means for calculating a threshold value (S) in accordance with the thus detected white and black peak values.

In a case where the sensitivity of the sensor is not constant, the white peak value (WB) showing the base portion of the medium and the black peak value (BP) showing the letter on the medium appear on the pixel value histogram distribution, and for this reason, by producing the threshold value inside these white and black peak values, the read-out image can be binary coded. That is, by producing the threshold value in the positions shown in FIG. 30A, signals near the black peak value can be correctly outputted as black portions and signals near the white peak value can be also correctly outputted as white portions. In this embodiment, the threshold value is calculated by using the following equation (5).

$$\text{Threshold value } (S)=\alpha\times(WP-BP)+BP (0<\alpha<1) \qquad (5)$$

($\alpha$ is a coefficient for determining threshold value, and an optional value may be adopted, which is optionally selected in accordance with a density of a medium to be read out and a quality of a desired output image.)

According to this embodiment, by using the white peak value (WP) and the black peak value (BP) for producing the threshold value, the binarization can be correctly performed.

According to this aspect of the present invention, the read-out of the medium having a width shorter than the read-out area of the image reading section can be also done as in the former aspect of the present invention mentioned hereinbefore.

That is, FIG. 31 shows a fourth embodiment of this aspect of the present invention for performing the read-out processing of the medium having a width shorter than the read-out area of the image reading section. In such case, a portion other than a portion to be read out is also read out (a portion outside the medium to be read) as a line data, and accordingly, data not related to the medium is also inputted and a correct pixel histogram distribution is not obtained. In order to obviate such defect, in this fourth embodiment, an effective area indication section 170 is further provided and the pixel value histogram distribution is produced by using only the data of a portion defined on the preliminarily designated line as the input data in the effective area indication section 170. The indication of the effective area will be determined for example by defining the width of the medium to be read out. In the image inputting apparatus, a portion to be treated as an effective signal in the signals read out in accordance with the effective area indication is recognized and the pixel value histogram is produced for only that portion and, then, the threshold value is produced (effective area in FIG. 31). According to such processings, the most optimum binarized threshold value can be produced even in a case of the medium to be read having a length shorter than the line length of the image reading section.

Figure 32:
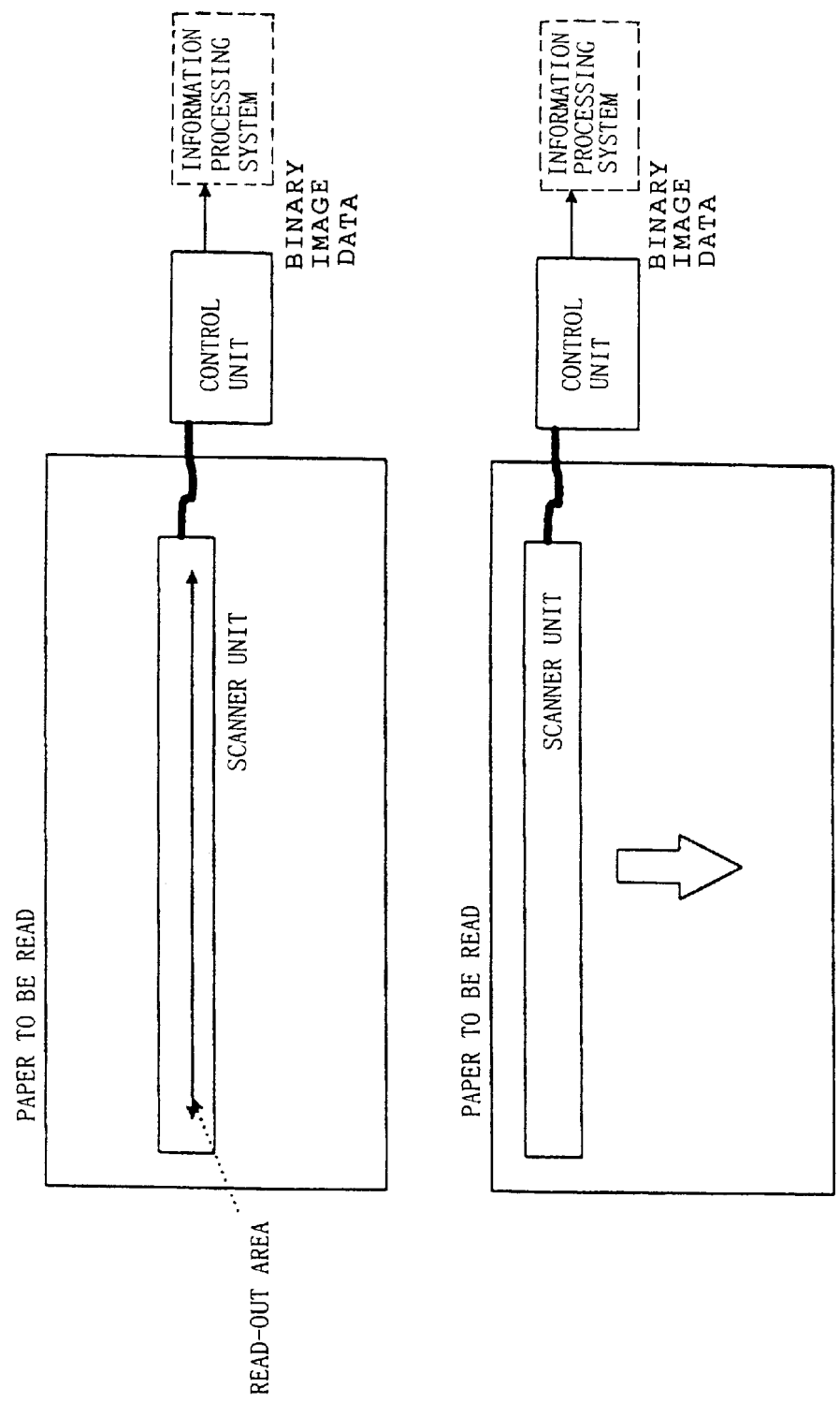
FIG. 32 is a view showing a fifth embodiment of the third aspect of the present invention.
Figure 33:
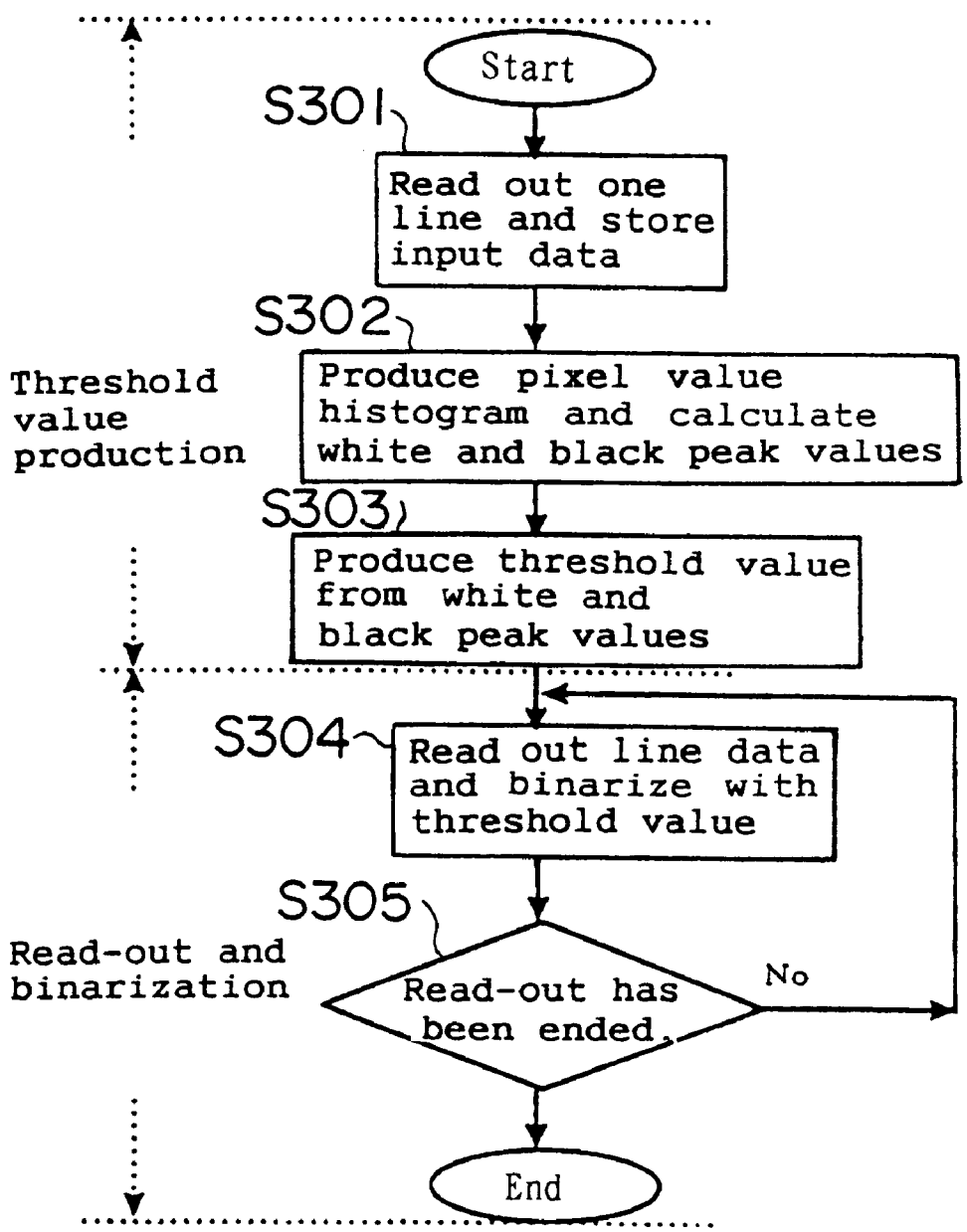
FIGS. 33 to 35 are flowcharts showing binary coding processings according to further embodiments of the third aspect of the present invention.
Figure 34:
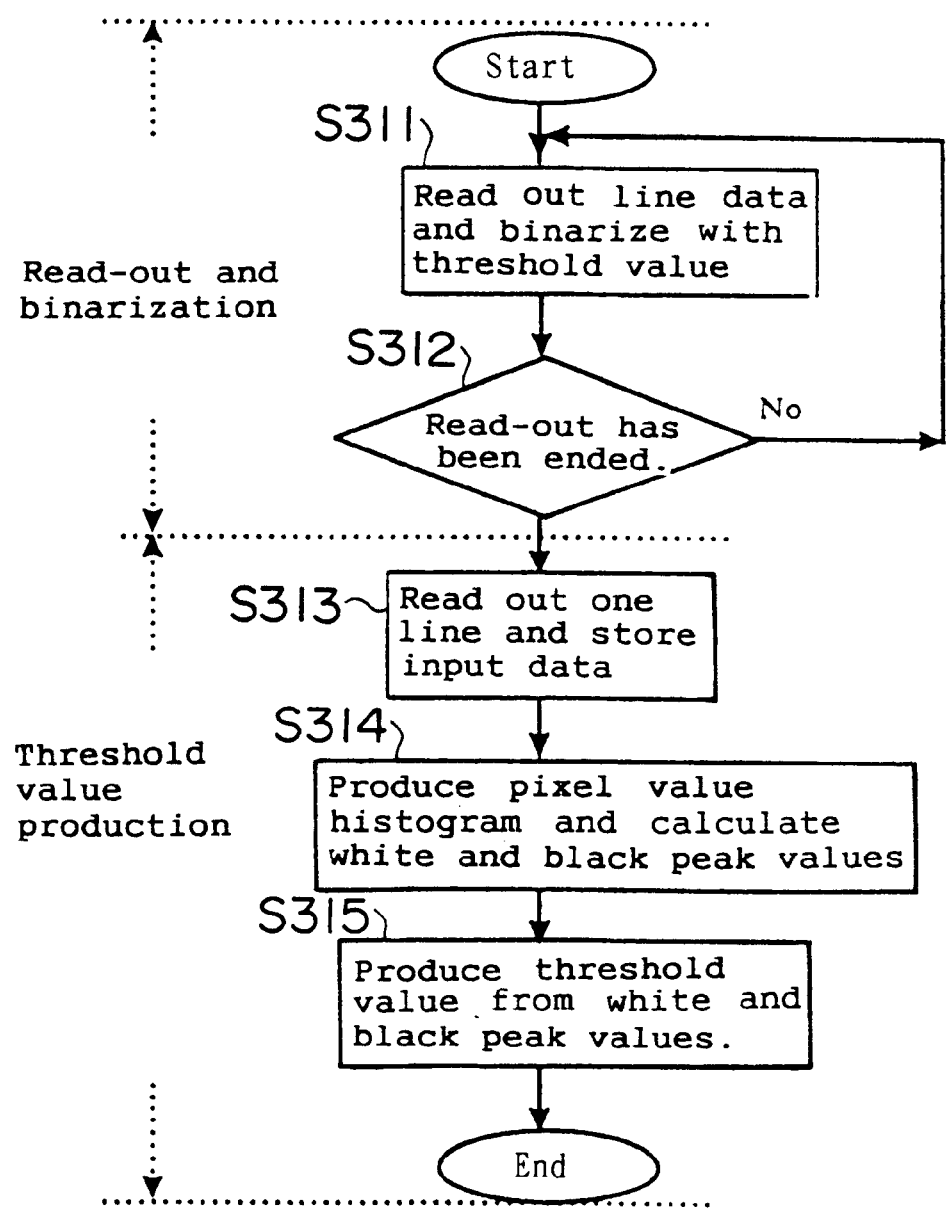
Figure 35:
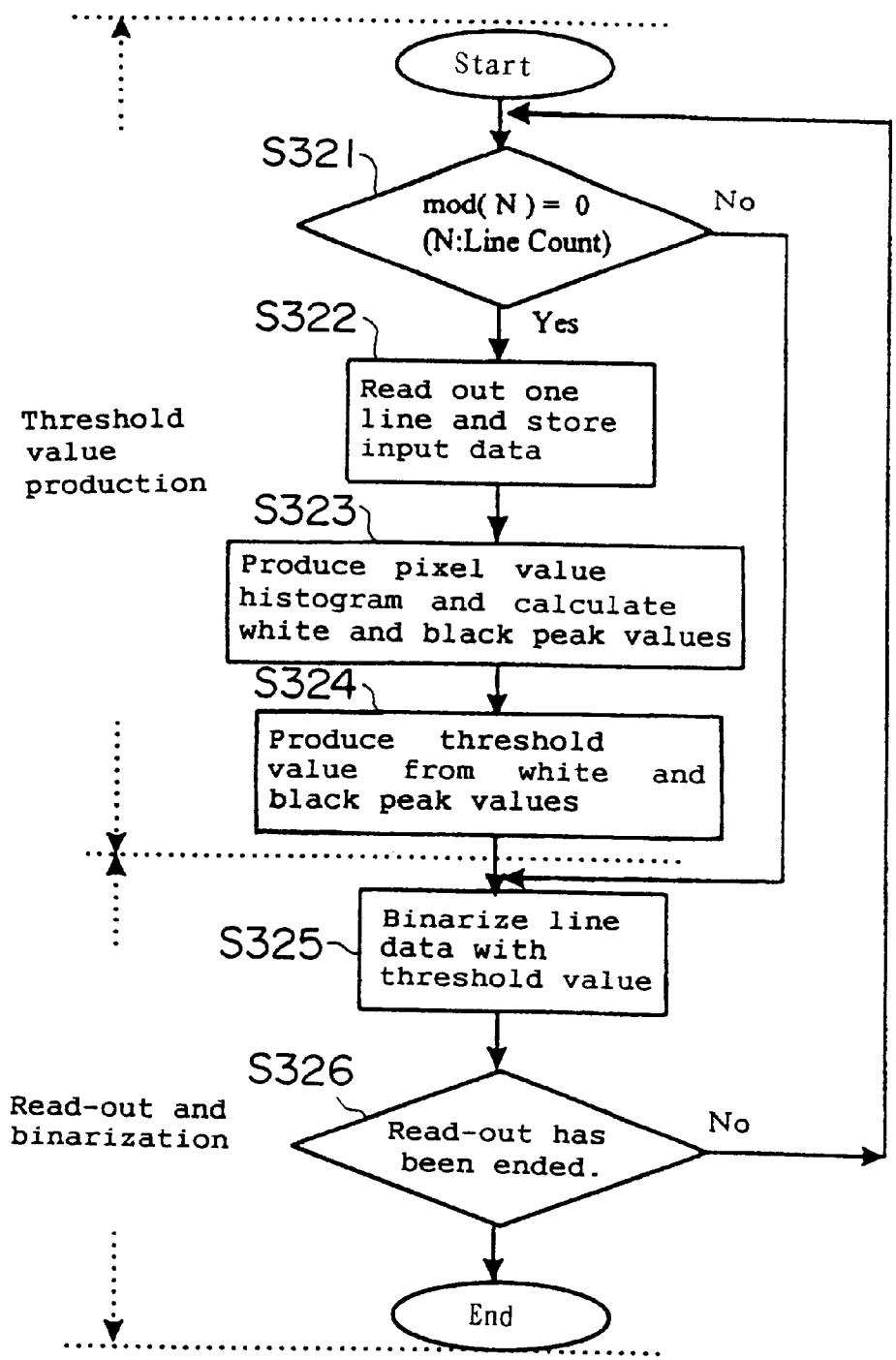
Figure 36:
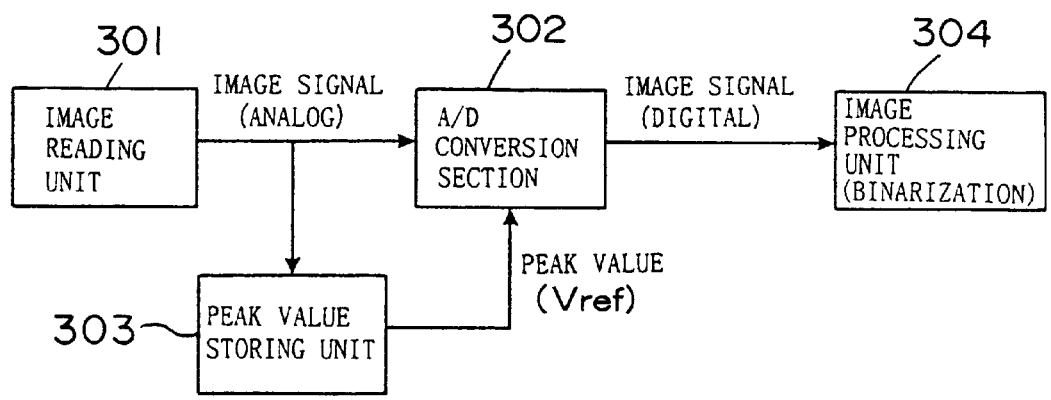
FIG. 36 is a block diagram of an image inputting apparatus of a conventional structure.
Figure 37:
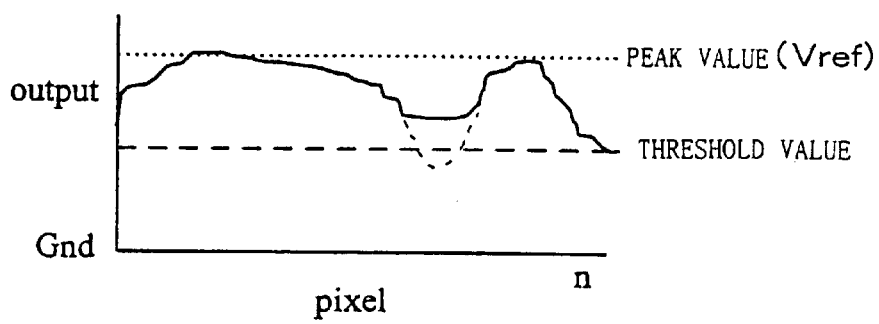
FIG. 37 is a graph showing a threshold value production according to the conventional apparatus.

FIG. 32 represents a fifth embodiment of this aspect of the present invention, and FIGS. 33 to 35 are flowcharts representing the read-out processing of the image inputting apparatus of FIG. 32.

These figures show the relationship between the line input data for determining the threshold value and the actual read-out process, and four systems (ways) of the line input for determining the threshold value are constituted as follows.

(1) Separate Processing System

Independent from the actual image read-out processing, one line input of the medium (paper) to be read is executed and a threshold value is preliminarily determined from the pixel value histogram distribution of the one line input data, separately, and the subsequent read-out is binarized with the threshold value determined.

(2) Front Read-Out System

The leading front line for read-out starting is one line inputted and a threshold value is determined from the pixel value histogram distribution obtained through the read-out. The binarization processing is executed with the threshold value determined at the front line read-out.

(3) Rear Read-Out System

The termination line for read-out ending is one line inputted and a threshold value is determined from the pixel value histogram distribution. The subsequent read-out processing is performed through the binarization with the threshold value determined at the end of the preceding read-out processing.

(4) Serial Processing System

A threshold value is determined from a pixel value histogram distribution per every one line at the same time of the one line image inputting, and the binarization is always performed with the newest threshold value by using the thus determined threshold value.

According to the embodiment mentioned above, through the adoption of these systems, a structure in accordance with priority of hardware and processing time will be selected.

According to the third aspect of the present invention mentioned above, there is provided an image inputting apparatus particularly provided with a pixel value histogram distribution producing means. Therefore, in the case where the read-out values largely vary due to the irregularity of the sensor sensitivity or lighting means, the threshold value can be properly produced and hence the binarization (binary coding) processing can be always accurately performed.

It is to be noted that although the present invention will be described hereinbefore in various aspects with reference to the preferred embodiments, the presentinvention is not limited to these embodiments and many other changes, modification and combinations may be made with out departing from the scope of the appended claims.

What is claimed is:

1. An image inputting apparatus to be used in combination with an information processing system comprising an image reading unit operatively connected to the image reading unit and the information processing system, said image reading unit comprising an image reading section for optically reading out an image on a medium to be read and converting a read-out image into an analog electric signal, and a movement measuring section for measuring a moving amount of the image reading section moving on the medium, comprising an image signal processing section for processing the analog image signal from the image reading section, a read-out control section for performing a driving control of the image reading section in accordance with the moving amount from the movement measuring section, and a PC card interface section operatively connected to the read-out control section and the external information processing system so as to perform interruption and access to the information processing system, and said PC card unit having a structure in shape of card capable of being inserted into a pre-determined portion of the information processing system in a manner such that, when the PC card unit is inserted there into the image reading unit is positioned outside the information processing system.

2. An image inputting apparatus according to claim 1, wherein said PC card unit and said image reading unit are integrated together so that the image reading unit project outward the information processing system so as to be rotatable about an axis extending at least one of an extending direction of the PC card unit and a direction perpendicular to the extending direction.

3. An image inputting apparatus according to claim 1, wherein said PC card unit and said image reading unit are composed of independent structures from each other, which are operatively connected through a connection means.

4. An image inputting apparatus according to claim 3, wherein said connection means comprises a flexible cable and a connector.

5. An image inputting apparatus according to claim 3, wherein said image reading unit has a box-shaped structure and said connection means is accommodated in the box-shaped image reading unit.

6. An image inputting apparatus according to claim 3, wherein said image reading unit further comprises an image signal amplifying section operatively connected to the image reading section for amplifying an analog image signal therefrom.

7. An image inputting apparatus according to claim 3, wherein said PC card unit further comprises a driving condition setting section operatively connected to the read-out control section for setting driving conditions for the image reading section.

8. An image inputting apparatus according to claim 3, wherein said image reading unit is further provided with means for giving image read-out start/finish instruction to the read-out control section of the PC card unit.

9. An image inputting apparatus according to claim 3, wherein said box-shaped image reading unit is further provided detachably with a reading assisting means at a surface portion thereof to read out an image on the medium by moving the medium in front of the surface of the image reading unit on which the reading assisting means is mounted.

10. An image inputting apparatus according to claim 9, wherein said reading assisting means is composed of a pair of rollers disposed with a gap, which are rolled by passing through the medium between the with substantially no load.

11. An image inputting apparatus according to claim 1, wherein said PC card unit further comprises means for changing an order to image data to be read out in accordance with an image reading direction preliminarily set to the read-out control section.

12. An image inputting apparatus according to claim 1, wherein said read-out control section performs image read-out control in accordance with an image read-out start/finish instruction from the information processing system.

13. An image inputting apparatus comprising an image reading unit and an image processing unit operatively connected to the image reading unit, said image reading unit comprising a sensor means for optically reading out an image on a medium to be read and an A/D conversion means for converting a read-out image into a digital electric signal, and said image processing unit comprising an image processing section operatively connected with said image reading unit for performing a binarization processing of the image signal, a data storing section for storing input data representing white and black portions of a medium to be read, and a threshold value producing section for producing a threshold value in accordance with data from said data storing section and transferring the threshold value to the image processing section, said threshold value producing section including a white bottom value detecting means for detecting a white bottom value as a minimum data in the input data of the white portion as a read-out reference and a threshold value calculating means for calculating the threshold value (S) by using the white bottom value (WB) detected by the white bottom value detecting means in accordance with the following equation:

$$S = \alpha \times WB (0 < \alpha < 1)$$

($\alpha$: coefficient for determining a threshold value).

14. An image inputting apparatus according to claim 13, wherein said threshold value producing means further includes a black peak value detecting means for detecting a black peak value as a maximum value in the input data of the black portion as a read-out reference and said threshold value calculating means calculates the threshold value (S) by using the white bottom value (WB) detected by the white bottom value detecting means and the black peak value (BP) detected by the black peak value detecting means in accordance with the following equation:

$$S=\alpha\times(WB-BP)+BP (0<\alpha<1)$$

($\alpha$: coefficient for determining a threshold value).

15. An image inputting apparatus according to claim 13, wherein said threshold value producing means further includes a black peak value storing means for storing data preliminarily set with a black peak value being a read-out reference and said threshold value calculating means calculates the threshold value (S) by using the white bottom value (WB) detected by the white bottom value detecting means and the black peak value (BP) stored in the black peak value storing means in accordance with the following equation:

$$S=\alpha\times(WB-BP)+BP (0<\alpha<1)$$

($\alpha$: coefficient for determining a threshold value).

16. An image inputting apparatus according to claim 13, wherein said image processing unit further includes a level correction means for correcting a level of the input data from the image reading unit before transferring the data to the image processing section.

17. An image inputting apparatus according to claim 16, wherein said level correction means is composed of a shading compensation section.

18. An image inputting apparatus according to claim 13, further comprising an area indication means for defining a usable area of the input data and transferring only data on a preliminarily designated area of the medium to be read as an input data to the threshold value producing section.

19. An image inputting apparatus comprising an image reading unit and an image processing unit operatively connected to the image reading unit,
   said image reading unit comprising a sensor means for optically reading out an image on a medium to be read and an A/D conversion means for converting a read-out image into a digital electric signal, and
   said image processing unit comprising an image processing section for performing a binarization processing of the image signal, a data storing section for storing input data from the image reading unit, a pixel value histogram distributing section for producing a pixel value histogram distribution in accordance with the input data, and a threshold value producing section for producing a threshold value in accordance with data from said pixel value histogram distribution producing section and transferring the threshold value to the image processing section for the binarization processing therein;
   wherein said input data storing section stores a specified one line data of the medium to be read and said threshold value producing section produces a threshold value in accordance with the thus stored one line data.

20. An image inputting apparatus according to claim 19, wherein said threshold value producing section includes a white peak value detecting means for detecting a white peak value in the input data of the white portion of the medium to be read, a black peak value detecting means for detecting a black peak value in the input data of the black portion of the medium and a threshold value calculating means for calculating the threshold value (S) by using the white peak value (WP) detected by the white peak value detecting means and the black peak value (BP) detected by the black peak value detecting means in accordance with the following equation:

$$S=\alpha\times(WP-BP)+BP (0<\alpha<1)$$

($\alpha$: coefficient for determining a threshold value).

21. An image inputting apparatus according to claim 19, wherein said pixel value histogram distribution producing section produces the pixel value histogram distribution only on the basis of the input data with a defined range on a preliminarily designated one line.

22. An image inputting apparatus comprising an image reading unit and an image processing unit operatively connected to the image reading unit,
   said image reading unit comprising a sensor means for optically reading out an image on a medium to be read and an A/D conversion means for converting a read-out image into a digital electric signal, and
   said image processing unit comprising an image processing section for performing a binarization processing of the image signal, a data storing section for storing input data from the image reading unit, a pixel value histogram distributing section for producing a pixel value histogram distribution in accordance with the input data, and a threshold value producing section for producing a threshold value in accordance with data from said pixel value histogram distribution producing section and transferring the threshold value to the image processing section for the binarization processing therein;
   said pixel value histogram distribution producing section produces the pixel value histogram distribution only on the basis of the input data with a defined range on a preliminarily designated one line.

23. An image inputting apparatus according to claim 22, wherein said image processing unit further comprises a shading compensation section for performing a shading compensation to the input data from the image reading unit and said data storing section stores the thus compensated input data.

24. An image inputting apparatus according to claim 22, wherein said input data storing section stores one line data per N lines (N: integer not less than 1) of the input data of the medium to be read and said threshold value producing section produces a threshold value in accordance with the thus stored line data.

* * * * *